US008373702B2

(12) United States Patent
Falchetto

(10) Patent No.: US 8,373,702 B2
(45) Date of Patent: Feb. 12, 2013

(54) SYSTEM AND METHOD FOR ADAPTIVE TESSELLATION OF A CURVE

(75) Inventor: Mirko Falchetto, Brescia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 943 days.

(21) Appl. No.: 12/466,784

(22) Filed: May 15, 2009

(65) Prior Publication Data

US 2010/0289802 A1 Nov. 18, 2010

(51) Int. Cl.
*G06T 11/20* (2006.01)

(52) U.S. Cl. ........................................ 345/442

(58) Field of Classification Search .................. 345/442
See application file for complete search history.

(56) References Cited

U.S. PATENT DOCUMENTS

| | | | | |
|---|---|---|---|---|
| 6,563,501 B2 * | 5/2003 | Sfarti | ........................ | 345/442 |
| 2002/0061125 A1 * | 5/2002 | Fujii | ........................ | 382/125 |
| 2010/0082248 A1 * | 4/2010 | Dorum et al. | ................. | 701/209 |

OTHER PUBLICATIONS

Pottmann et al.; "Approximation with Active B-spline Curves and Surfaces;" Proceedings of the 10th Pacific Conference on Computer Graphics and Applications (PG'02), Tsinghua University, Beijing, China, Oct. 2002, pp. 1-18; IEEE Computer Society.*
Pottmann et al.; "Geometry of the Squared Distance Function to Curves and Surfaces;" Institute of Geometry, Vienna University of Technology, Wien, Austria; Jan. 2002, pp. 1-20.*
Wang et al.; "Fitting B-Spline Curves to Point Clouds by Curvature-Based Squared Distance Minimization;" ACM Transactions on Graphics, vol. 25, No. 2, Apr. 2006, pp. 214-238.*
Rice et al.; "OpenVG Specification Version 1.1;" Dec. 2008, Khronos Group, Inc.*

* cited by examiner

*Primary Examiner* — Edward Martello
(74) *Attorney, Agent, or Firm* — Seed IP Law Group PLLC

(57) ABSTRACT

A graphic module wherein, given a curve $P(x,y)=P(x(t), y(t))$ between two points $P_0(x,y)=P_0(x(t_0), y(t_0))$ and $P_1(x,y)=P_1(x(t_1), y(t_1))$, in the screen coordinates, a calculating circuit computes a curve mid-point $P_{half}(x,y)=P_{half}(x(t_{half}), y(t_{half}))$, where $t_{half}=(t_0+t_1)/2$ on the curve, computes a segment mid-point $P_M(x,y)=(P_0(x,y)+P_1(x,y))/2$ on segment $\overline{P_0P_1}$, computes a distance function d between the curve mid-point and the segment mid-point, and, given two thresholds THR0 and THR1, with THR0<=THR1, if d<THR0, it generates line segment $\overline{P_0P_1}$, and if THR0<=d<THR1, it generates two line segments $\overline{P_0P_{half}}$ and $\overline{P_{half}P_1}$ if d>=THR1, it repeats the previous steps for the curve portions from $P_0$ to $P_{half}$ and from $P_{half}$ to $P_1$.

19 Claims, 14 Drawing Sheets

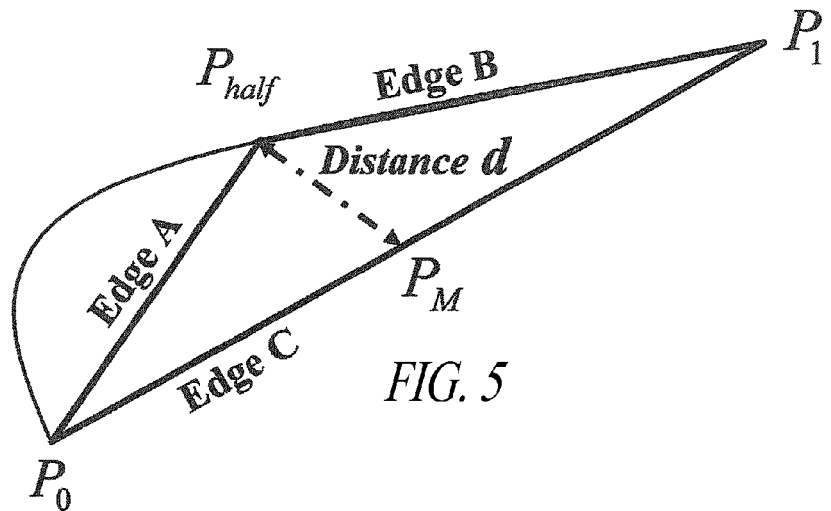
FIG. 5
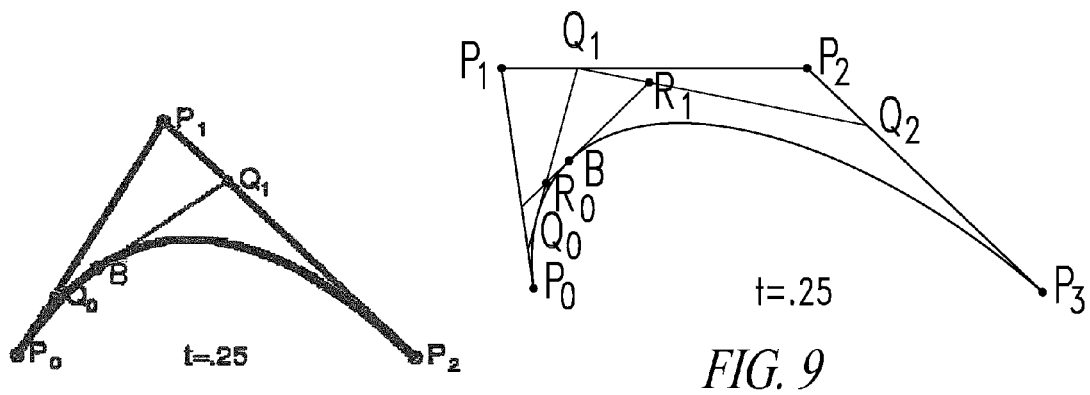
FIG. 8
FIG. 9
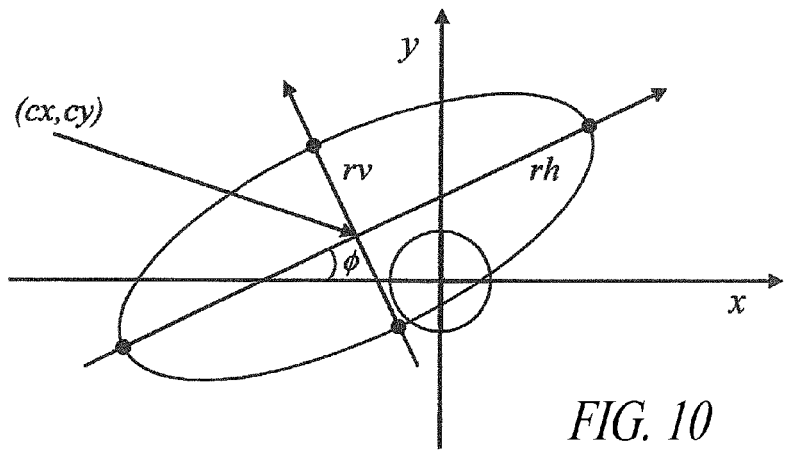
FIG. 10

```
float estimateT(const Point u0, const Point u1, const boolean CW)
{
    int iterationCounter;
    Point u1';
    float endT  = -1.0f;

// Rotate so that u0 is mapped onto point (0, -1) on Unit Circle
    // That correspond to t = -1.0f using the rationals bezier formula
    u1'.x  =  (u1.y * u0.x - u1.x * u0.y);
    u1'.y  = -(u1.x * u0.x + u1.y * u0.y);

if (CW==true)
        u1'.x = -u1'.x;

// Left Half of the Unit Circle
    if (u1'.x<=0.0f)
    {
        endT += 2.0f; u1'.x = -u1'.x; u1'.y = -u1'.y; }

// Now we are sure we are always on the Right-Bottom Half of the Unit Circle
    // Hence it must be -1.0f <= T <= 0.0f if (u1'.x>0.0f)
    {
        // Optimization in order to simplify the difference estimation inside
        // the loop
        float distancek        = (u1'.x + 1.0f);

float t0, t1, tHalf, distance;
```

FIG. 13A

```
if (u1'.y==0.0f)
    return (endT + 1.0f);

if (u1'.y>0.0f)
    { t0 = 0.0f; t1 = 1.0f; }
else
    { t0 = -1.0f; t1 = 0.0f; } for ( iterationCounter=0; iterationCounter<32; iterationCounter++ )
{
    tHalf    = (t0 + t1) * 0.5f;
    distance = distanceK * (tHalf * tHalf) + distanceK - 2.0f;

if ( u1'.y > 0.0f )
        distance = -distance;

if ( distance < 0.0f )
        t1 = tHalf;
    else
        t0 = tHalf;
} endT += (1.0f + tHalf);

return endT;
```

*FIG. 13B*

| Configuration | Tessellated Edges | Iterations Done (MatMultiply) | Ratio | Single Edge (C) | Double Edge (A+B) |
|---|---|---|---|---|---|
| Fixed Tessellation (256 Segments) (Current R Reference) | 10,632,720 | 10,632,720 | 1.000 | 100.00% | 0.00% |
| Adaptive Tessellation - Reference Threshold at 0.1f | 229,772 | 393,043 | 1.711 | 100.00% | 0.00% |
| Adaptive Tessellation Thresholds (0.25f - 0.0635f) (Performant Profile) | 252,417 | 304,885 | 1.208 | 64.07% | 35.93% |
| Adaptive Tessellation Thresholds (0.0635f - 0.015625f) (openVG Compliant) | 355,430 | 448,180 | 1.261 | 61.88% | 38.12% |

SYSTEM AND METHOD FOR ADAPTIVE TESSELLATION OF A CURVE

BACKGROUND

1. Technical Field

The present disclosure relates to the technical field of graphic rendering and, in particular, to a system and method for adaptive tessellation of a curve.

2. Description of the Related Art

In the context of the present disclosure, tessellating a curve involves approximating a curve (defined using some appropriate algebraic formula) as a series of simple straight line segments. It could be seen also as a process of sampling or quantization of a curve. From the continuous space of mathematical formula, tessellation involves the utilization of a certain amount of discrete straight line segments that approximate the curve itself. This is a typical problem when dealing with 2D graphics processing, and as such it is a crucial problem when dealing with the specific OpenVG standard promoted by the Khronos group because tessellation is a core feature of the standard itself. OpenVG is a standard API designed for hardware-accelerated 2D vector graphics. Vector graphics is the use of geometrical primitives such as lines, curves and shapes, which are all based on mathematical equations, to represent images in computer graphics.

Vector graphics formats are complementary to raster graphics, which is the representation of images as an array of pixels, as it is typically used for the representation of photographic images. It is aimed primarily at cell phones, media and gaming consoles such as the PlayStation 3, and other consumer electronic devices. It will help manufacturers create flashier user interfaces that are less dependent on energy-hungry CPUs. OpenVG is well suited to accelerating Flash or SVG sequences. The method disclosed herein is a novel proposal for solving a well-know problem that usually is addressed as the tessellation of a 2D Curve described in some algebraic form from a functional point of view as part of the path stage module of a compliant OpenVG 2D graphics pipeline.

In the field of 2D graphics, there are numerous algorithms to solve the problem of correctly tessellating a curve. What discriminates among different algorithms is the way the sampling is performed.

There are algorithms based on a fixed sampling. These methods are very simple to implement, but they are the ones that offer the worst results. A curve is always approximated in a fixed number of segments, for example 256 segments, no matter the particular curve formula and associated transformation. The main problem of these methods is the fact that a curve could be over-sampled or under-sampled depending on the curve type or transform applied to it. In the case of over-sampling, the curve is tessellated by higher numbers than is strictly required. Hence, many tessellated segments are not visible at all in the rendered scene, but the pipeline complexity is increased because it is indeed necessary to process them once they are generated. When an under-sampled curve is generated, it happens that the approximation done on the curve is poor; hence, it produces visible artifacts on the screen, i.e., the line segments become visible.

A completely different approach is to use an adaptive approach: The curve is in general approximated in a variable number of straight line segments according to a fixed threshold "f", generally called the "flatness" of the curve. On these algorithms each produced line segment has always a deviation or distance from the real curve that is always no more than f.

Moreover, considering the position of the sampled points, there are algorithms in which the sampled points always lie on the exact curve and algorithms, such as the so-called "trapezoid tessellation", in which the sampled points lie "near" the exact curve.

BRIEF SUMMARY

The present disclosure relates to an adaptive tessellation method in which the sampled points lie exactly on the curve to tessellate.

The present disclosure provides a tessellation method of the above described type that increases the efficiency of the algorithm and therefore obtains the same quality of traditional adaptive methods at a lower complexity or at the same complexity with a higher level of detail (number of line segments).

Known adaptive tessellation methods are specialized to well defined curves expressed by their algebraic equations. In particular, known methods are not applicable to all the curves as specified by the OpenVG Standard. In fact, while this standard includes Quadratic Bezier curves, Cubic Bezier curves and Arc Segment curves, the known tessellation methods are able to tessellate only the Quadratic and Cubic Bezier Curves. For tessellating an Arc Segment curve, usually this is firstly approximated with a quadratic or cubic Bezier curve.

Therefore the present disclosure provides a general purpose tessellation method which, for example, can correctly tessellate all the openVG type of curves.

In accordance with another aspect of the disclosure, highly efficient algorithm, with a very simple structure, is provided that is suitable for a fully hardware implementation.

Furthermore, known tessellation methods evaluate the flatness of a curve directly on the curve space and not on the screen space. This can lead to an incorrect tessellation, especially when the curve is heavily perspective distorted. Therefore, the present disclosure provides a tessellation method that evaluates the flatness of a curve directly on the screen space.

One embodiment of the present disclosure provides a method for adaptive tessellation of a curve $P(x,y)=P(x(t), y(t))$ between two points $P_0(x,y)=P_0(x(t_0), y(t_0))$ and $P_1(x,y)=P_1(x(t_1), y(t_1))$ for display on a display device and implemented in a computer processor, comprising:

defining two thresholds THR0 and THR1, with THR0<=THR1;

computing a curve mid-point $P_{half}(x,y)=P_{half}(x(t_{half}), y(t_{half}))$, where $t_{half}=((t_0+t_1)/2$ n the curve;

computing a segment mid-point $P_M(x,y)=(P_0(x,y)+P_1(x,y))/2$ on segment $\overline{P_0P_1}$;

computing a distance function d between said curve mid-point and said segment mid-point;

if d<THR0, then line segment $\overline{P_0P_1}$ is generated as a good approximation of the curve from $P_0$ to $P_1$;

if THR0<=d<THR1, than two line segments $\overline{P_0P_{half}}$ and $\overline{P_{half}P_1}$ are generated as a good approximation of the curve from $P_0$ to $P_1$;

if d>=THR1, then the previous steps are repeated for the curve portions from $P_0$ to $P_{half}$ (being $P_0^{new}=P_0$ and $P_1^{new}=P_{half}$) and from $P_{half}$ to $P_1$ (being $P_0^{new}=P_{half}$ and $P_1^{new}=P_1$).

According to one embodiment, the distance function d is a square distance function $d=(P_{half}-P_M)^2=(x(t_{half})-P_{Mx})^2+(y(t_{half})-P_{My})^2$, where $P_{Mx}$ and $P_{My}$ are the x and y coordinated of the segment mid-point $P_M$.

Preferably, the curve P(x,y)=P(x(t), y(t)) is a curve on a display screen space, and the method comprises a set-up phase in which the display screen space coefficients of the curve are computed starting from given coefficients of the curve in the known curve coordinates space.

According to one embodiment, the curve in the display screen space is a Rational Bezier Curve of degree 3 representing the whole set of curves as specified by the open VG Standard (i.e., Quadratic and Cubic Bezier curves and Arc Segments curves).

BRIEF DESCRIPTION OF THE SEVERAL VIEWS OF THE DRAWINGS

The features and advantages of the system and method according to various embodiments of the disclosure will be apparent from the description given below, with reference to the following figures, in which:

FIG. 5 shows an example of tessellation of a curve with the method according to the disclosure;

FIG. 8 represents a Quadratic Bezier curve;

FIG. 9 represents a Cubic Bezier curve;

FIG. 10 shows a Unit Circle to Ellipse mapping for the tessellation of an arc segment curve;

FIGS. 13A and 13B are a software code portion for the estimation of the Arc Segment endpoint;

DETAILED DESCRIPTION

Figure 1:
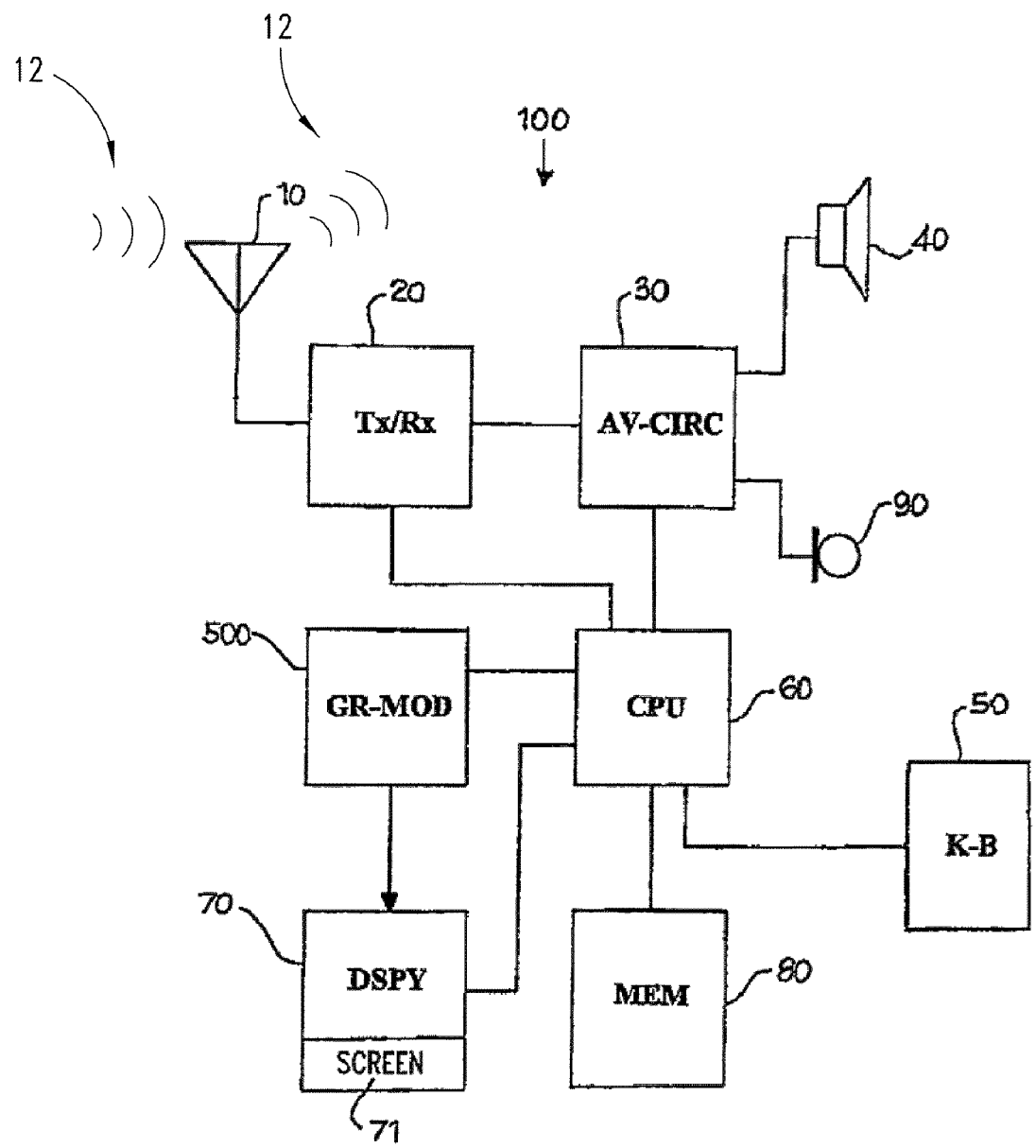
FIG. 1 shows a graphic system according to one embodiment of the disclosure.

FIG. 1 shows a graphic system according to an embodiment of the disclosure, which includes a graphic module 500 (GR-MOD). The graphic system 100 illustrated in FIG. 1 is a mobile phone, but in accordance with further embodiments of the disclosure, the graphic system 100 can be another system such as a Personal Digital Assistant (PDA), a computer (e.g., a Personal Computer), a Play Station.

As an example, the mobile phone 100 can be a cellular phone provided with an antenna 10, a transceiver 20 (Tx/Rx) connected with the antenna 10 to receive and transmit signals, such as radio frequency signals, an audio circuit unit 30 (AU-CIRC) connected with the transceiver 20. A speaker 40 and a microphone 90 are connected with the audio circuit unit 30.

The mobile phone 100 is further provided with a CPU (Control Processing Unit) 60 for controlling various functions and, particularly, the operation of the transceiver 20 and the audio circuit unit 30 according to a control program stored in a system memory 80 (MEM), which in turn is connected to the CPU 60. The graphic module 500 is coupled to and controlled by the CPU 60. Moreover, the mobile phone 100 is provided with a display unit 70 having with a corresponding screen 71 (e.g., a liquid crystal display, DSPY), and a user interface 50, such as an alphanumeric keyboard (K-B).

The graphic module 500 is configured to perform a set of graphic functions to render an image on the screen 71 of the display 70 that is visible to a user. Preferably, the graphic module 500 is a graphic engine configured to rendering images, offloading the CPU 60 from performing such a task. For purposes of the present disclosure, the term "graphic engine" means a device that performs rendering in hardware. The term "graphic accelerator", also employed in the field, is equivalent to the term graphic engine.

Alternatively, the graphic module 500 can be a graphic processing unit (GPU) wherein the rendering functions are performed on the basis of hardware and software instructions. In accordance with a further embodiment, some or all the rendering functions are performed by the CPU 60.

Figure 2:
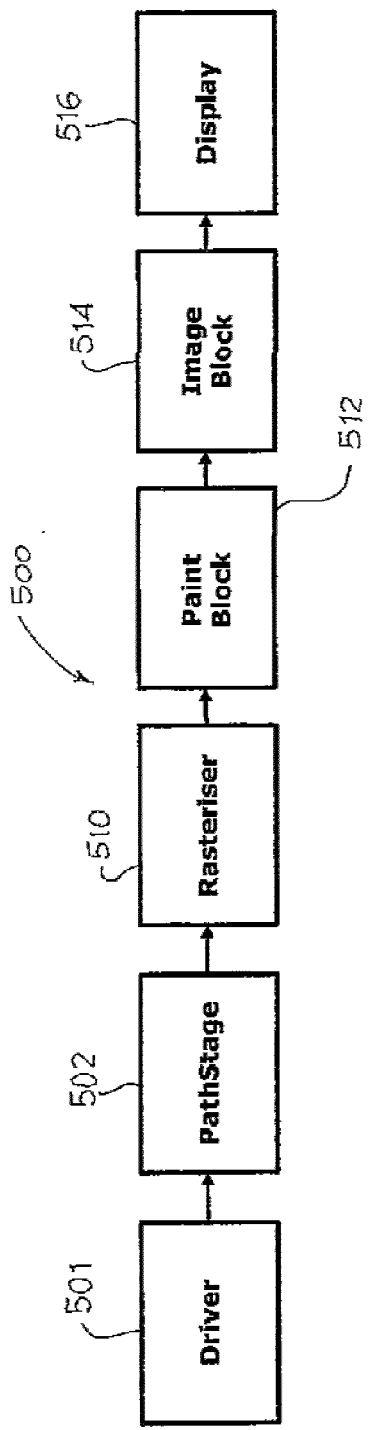
FIG. 2 shows an example of an OpenVG standard pipeline according to one embodiment of the disclosure.
Figure 3:
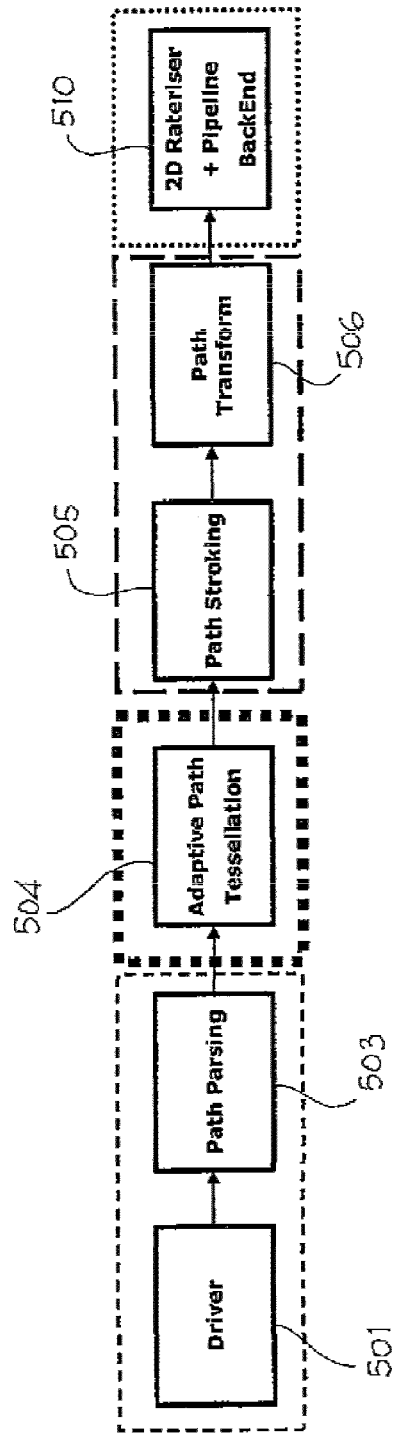
FIG. 3 shows in more detail part of the pipeline of FIG. 2.

In FIG. 2 a diagram of the graphic module or engine 500 is shown by means of functional blocks. The graphic engine 500 can perform the rendering of 2D (bi-dimensional) images, which are displayed on a the screen 71 of the display 70.

The graphic engine 500, illustrated in FIG. 2, includes a driver 501, a path stage block 502, a rasterizer module 510, a paint block 512, an image block 514 and a display module 516.

The driver 501 is a block having interface tasks in the form of stored software, i.e., computer code, and is configured to accept commands from software programs (e.g., Application Protocol Interface—API) running on the CPU 60 and then translate them into specialized commands for the other blocks of the graphic engine 500.

In accordance to one embodiment, the path stage block 502 includes a path parsing module 503, an adaptative path tessellation module 504, a path stroking module 505, and a path transform module 506.

A path is a combination of 2D primitives that define the contour of an image to be represented on the display. Such primitives can be simple segments (and in this case they are not sent to the path tessellation module 504) or more complex curves, such as Bezier curves or ellipse arches, which must be tessellated. Therefore, the path parsing module 503 has the task of analyzing the single primitives of the path submitted by the application through the driver 501, and to perform a primitive reordering operation, eventually sending the primitives to the tessellation module 504.

Once the path has been approximated in a set of rectilinear segments by the tessellation module 504, the path stroking module 505 applies a thickness to the segments, if required by the application.

The path transform module 506 applies to the geometry of the current path a transformation from user coordinates to surface coordinates, producing drawing surface coordinates.

The rasterizer block 510 is configured to perform processing of primitive data received from the path block 502 so as to generate pixel information images such as the attribute values of each pixel. The attributes are data (such as color, coordinates position, texture coordinates, etc.) associated with a primitive. In accordance with one embodiment, the rasterizer block 510 includes binner and parser stages and a fragment processor.

Figure 4:
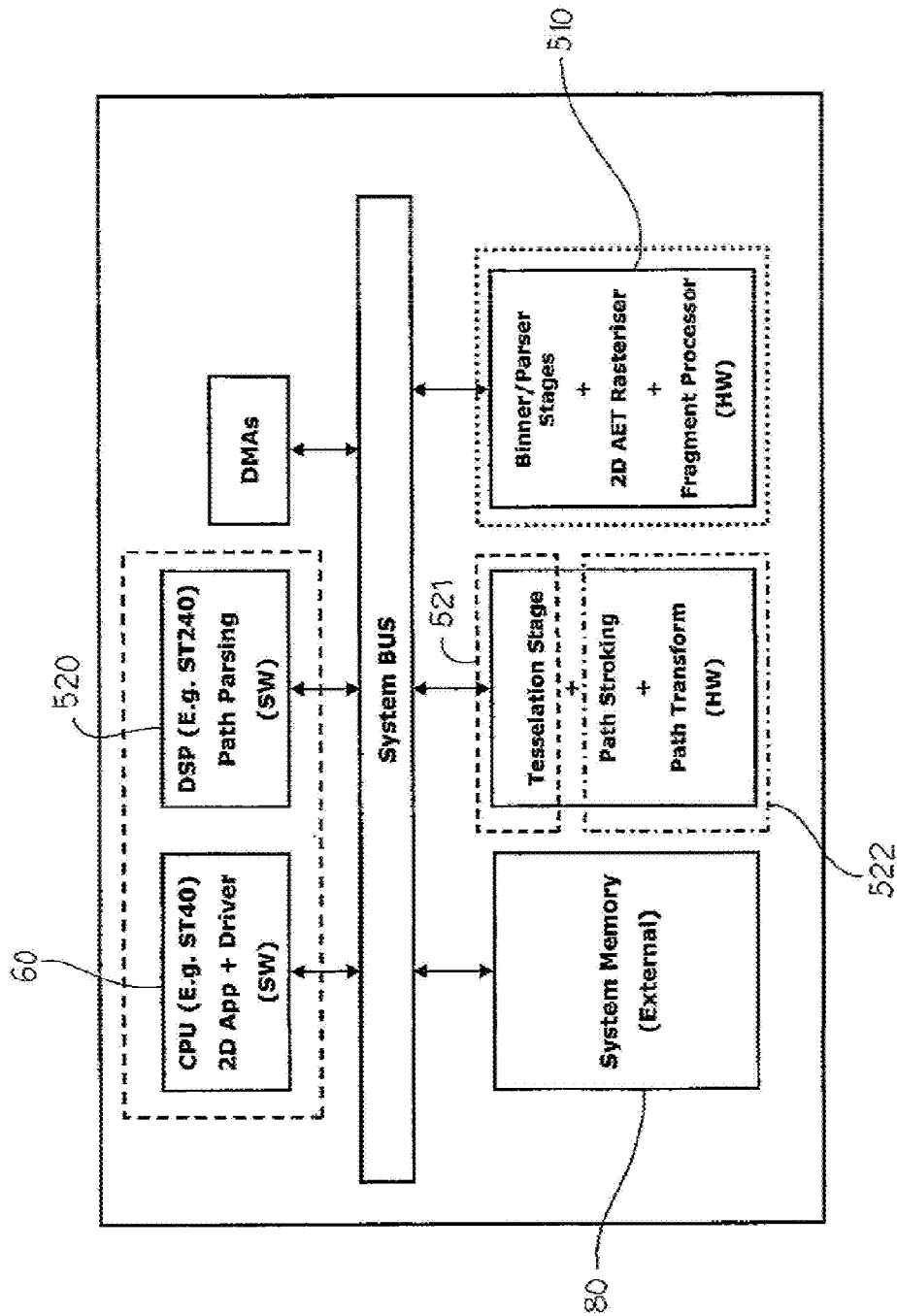
FIG. 4 shows an example of implementation of the graphic system in accordance with one embodiment of the disclosure.

FIG. 4 shows a preferred embodiment of a graphic system according to the disclosure and including the graphic engine module 500. This architectural scheme is developed to work effectively in any 2D HW accelerated Graphics Pipeline. In particular, since the G4ES project is orientated towards the integration into the ST HDTV Set-Top-Box decoders, this solution is developed for a low cost pipeline for embedded devices.

According to a preferred embodiment, the driver 501 is software implemented by the CPU 60. The path parsing block 502 is also software implemented by a DSP 520.

Advantageously, as will be explained later, the adaptative path tessellation method according to the disclosure is implemented in hardware by a tessellation electronic circuit 521. According to a preferred embodiment, the path stroking stage 505 and the path transform stage 506 are implemented in hardware by electronic circuitry 522.

In operation, the system that utilizes the adaptative path tessellation module 504 is configured to implement the hereinafter described adaptative tessellation method.

Figure 6A:
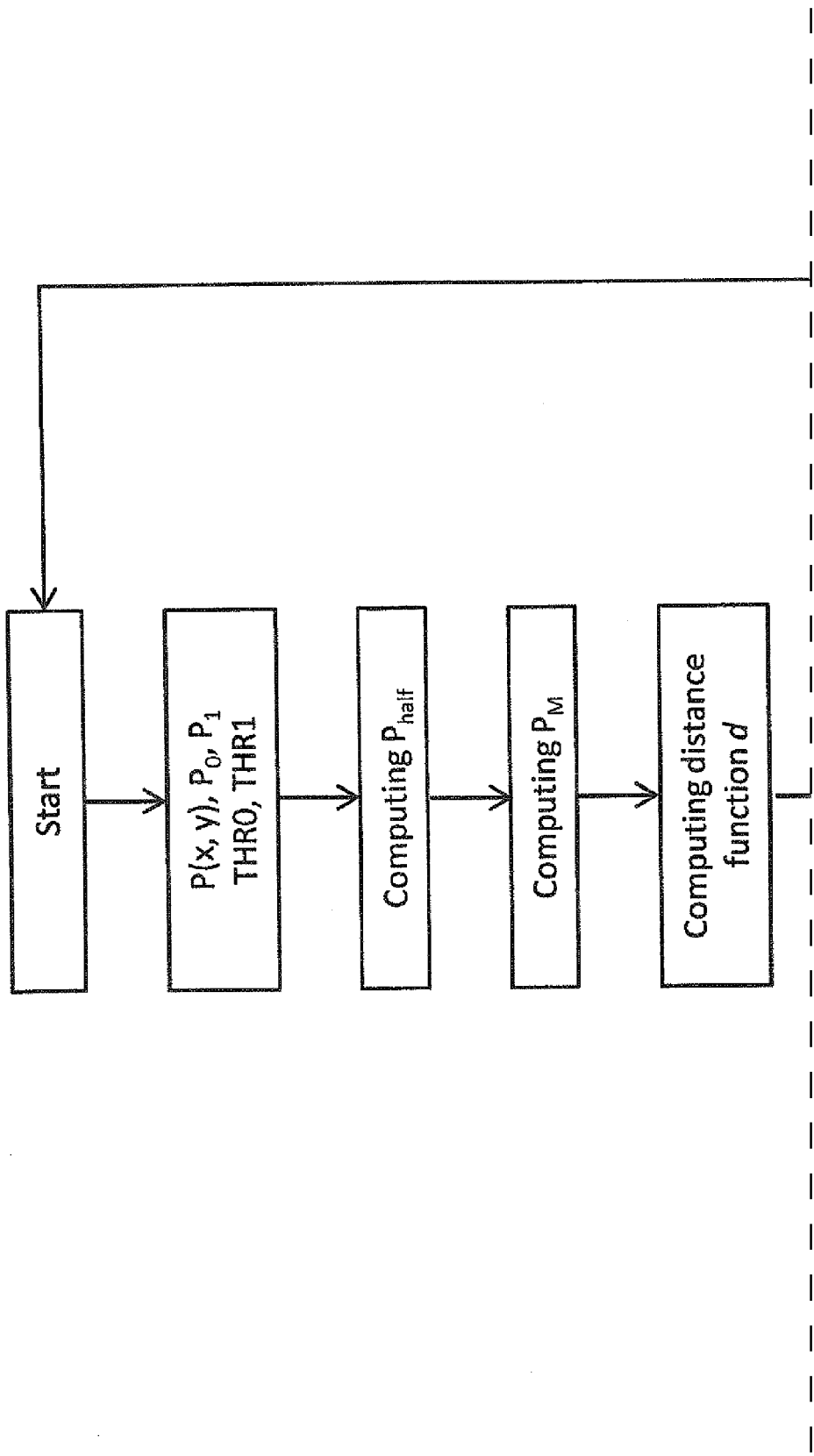
FIGS. 6A and 6B are a flowchart representing the tessellation method according to the disclosure according to one embodiment.
Figure 6B:
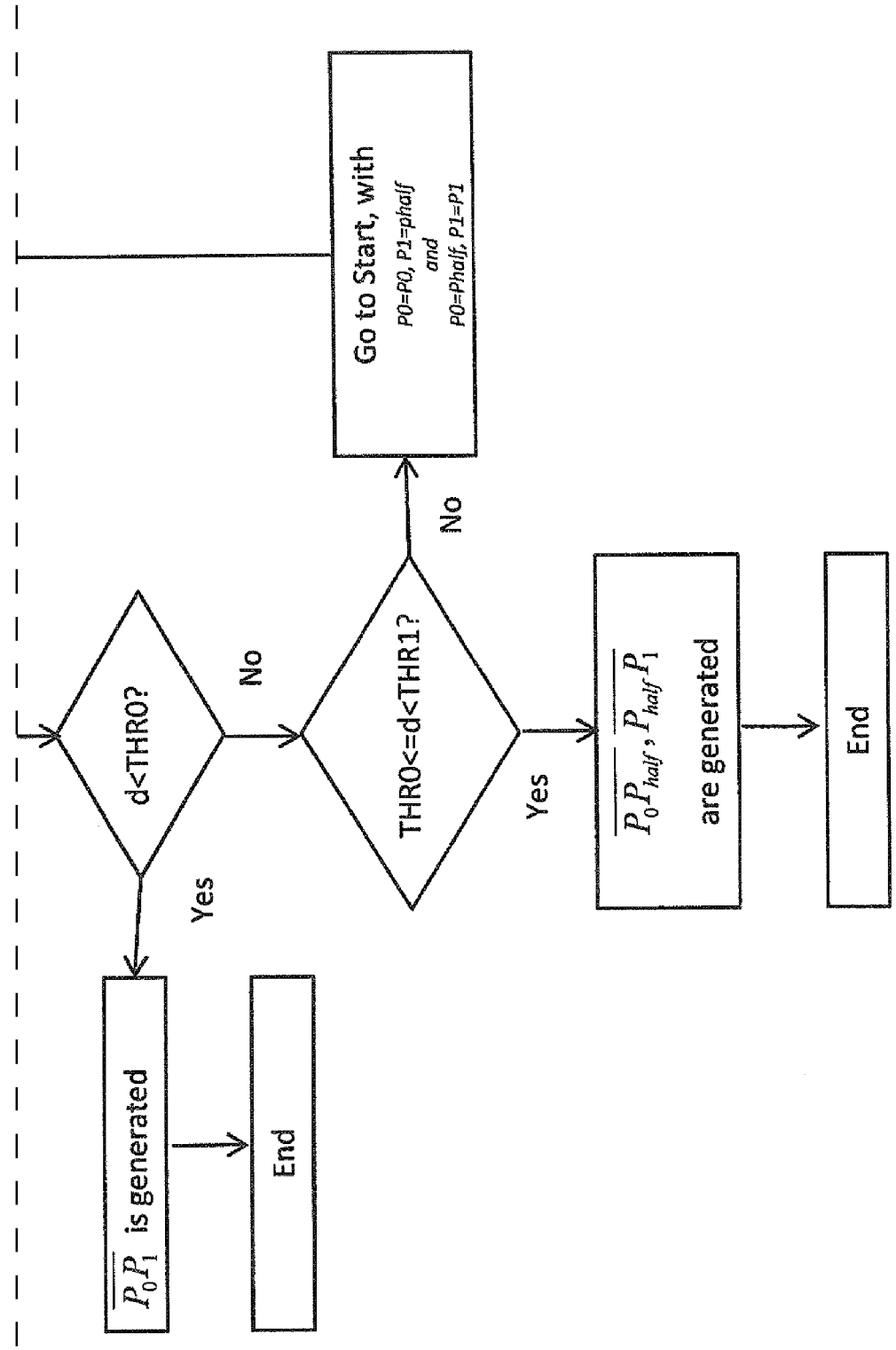

According to one embodiment of the disclosure, P(x,y)=P(x(t), y(t)) indicates a generic parametric curve to be tessellated between two given points $P_0(x,y)=P_0(x(t_0), y(t_0))$ and $P_1(x,y)=P1(x(t_1), y(t_1))$ with the adaptive method described below (FIGS. 5 and 6).

The method requires the identification of two thresholds THR0 and THR1, with THR0<=THR1, chosen according to the desired quality or closeness of the approximation to the curve. For example, THR0 is about half a pixel and THR1 is about one pixel in size. However, THR0 can be any fraction of a pixel or one or more pixels, as can be THR1 so long as THR0<=THR1.

In a first step, a curve mid-point $P_{half}(x,y)=P_{half}(x(t_{half}), y(t_{half}))$, where $t_{half}=((t_0+t_1)/2$ on the curve, is computed.

In a second step, a segment mid-point $P_M(x,y)=(P_0(x,y)+P_1(x,y))/2$ on segment $\overline{P_0P_1}$ is computed.

Then, a distance function d between said curve mid-point and said segment mid-point is computed.

At this point, three cases could happen:
 if d<THR0, then line segment $\overline{P_0P_1}$ (edge C in FIG. 2) is generated as a good approximation of the curve from $P_0$ to $P_1$; since endpoint $P_1$ is reached, the tessellation of the curve is completed;
 if THR0<=d<THR1, then two line segments $\overline{P_0P_{half}}$ and $\overline{P_{half}P_1}$ (edges A and B in FIG. 5) are generated as a good approximation of the curve from $P_0$ to $P_1$; since endpoint $P_1$ is reached, the tessellation of the curve is completed;
 if d>=THR1, then the previous steps are repeated for the curve portions from $P_0$ to $P_{half}$ and from $P_{half}$ to $P_1$.

According to a preferred embodiment, the distance function d is a square distance function $d=(P_{half}-P_M)^2=(x(t_{half})-P_{Mx})^2+(y(t_{half})-P_{My})^2$, where $P_{Mx}$ and $P_{My}$ are the x and y coordinates of the segment mid-point $P_M$.

It should be noted that the use of two thresholds THR0 and THR1 instead of the single threshold usually used allows for an increased efficiency of the algorithm. In fact, the added threshold is introduced in order to have a sort of "prediction" on the distance function evaluation of step (t+1) during the evaluation of $P_{half}$ at step t. In particular, with known algorithms having a single threshold THR, the point $P_{half}$ is always computed but it is never used effectively as an end-point of a tessellated straight line edge. On known algorithms, when the distance d reaches the desired threshold THR, edge $\overline{P_0P_1}$ (edge "C" in FIG. 5) is sent, discarding already computed point $P_{half}$. This behavior increases the need to calculate the points onto the curve to always twice compared to the method according to the disclosure.

It should be noted that, when a curve needs to be stroked, an additional threshold THR2 is introduced on local variation of the curve tangent in order to prevent artifacts on curve stroking generation.

According to a preferred embodiment, the curve P(x,y)=P(x(t), y(t)) to which the tessellation method is applied is a curve as defined on the display screen space, for example, the display screen face that is visible to the user. Therefore, since the curve is given in the curve coordinates spaces, the method includes a set-up phase in which the coefficients of the curve in the "screen space" are computed starting from the coefficients of the curve in the "curve coordinates" space.

As a particular and preferred case, the curve in the screen space is a Rational Bezier Curve of degree 3 able to exactly represent the whole set of curves as specified by the openVG Standard and defined as $$x(t)=x'(t)/w'(t); y(t)=y'(t)/w'(t), \qquad (1.0)$$

where $$x'(t)=A_x t^3+B_x t^2+C_x t+D_x t\epsilon[t_0,t_1]$$

$$y'(t)=A_y t^3+B_y t^2+C_y t+D_y t\epsilon[t_0,t_1]$$

$$w'(t)=A_w t^3+B_w t^2+C_w t+D_w t\epsilon[t_0,t_1] \qquad (1.1)$$

Given a generic point $P(x_{cure}(t), y_{curve}(t))$ of the curve expressed in curve coordinates, the corresponding point in the screen space coordinates is obtained as $$P(x(t),y(t))=P(x'(t)/w'(t),y'(t)/w'(t)), \qquad (1.2)$$

where $$\begin{bmatrix} x'(t) \\ y'(t) \\ w'(t) \end{bmatrix} = \begin{bmatrix} s_x & sh_x & t_x \\ sh_y & s_y & t_y \\ w_0 & w_1 & w_2 \end{bmatrix} \begin{bmatrix} x_{curve}(t) \\ y_{curve}(t) \\ 1 \end{bmatrix} \qquad (1.3)$$

where $s_x$ and $s_y$ are the values controlling (on x and y coordinates) the scaling of the curve, $sh_x$ and $sh_y$ are the shearing coefficients of the curve, $t_x$ and $t_y$ are the translation coefficients (along the x and y axes respectively, and $w_0$, $w_1$ and $w_2$ are the coefficients that control the perspective mapping.

In other words, the matrix $$MAT = \begin{bmatrix} s_x & sh_x & t_x \\ sh_y & s_y & t_y \\ w_0 & w_1 & w_2 \end{bmatrix}$$

is a perspective "curve to surface" matrix which transforms a curve in the curve coordinates space into a curve in a screen space, taking into account a possible perspective distortion by means of coefficients $w_0$, $w_1$ and $w_2$.

When the transformation is not perspective (so called "affine transform"), we have that $w_0=w_1=0$ and $w_2=1$.

Figure 7:
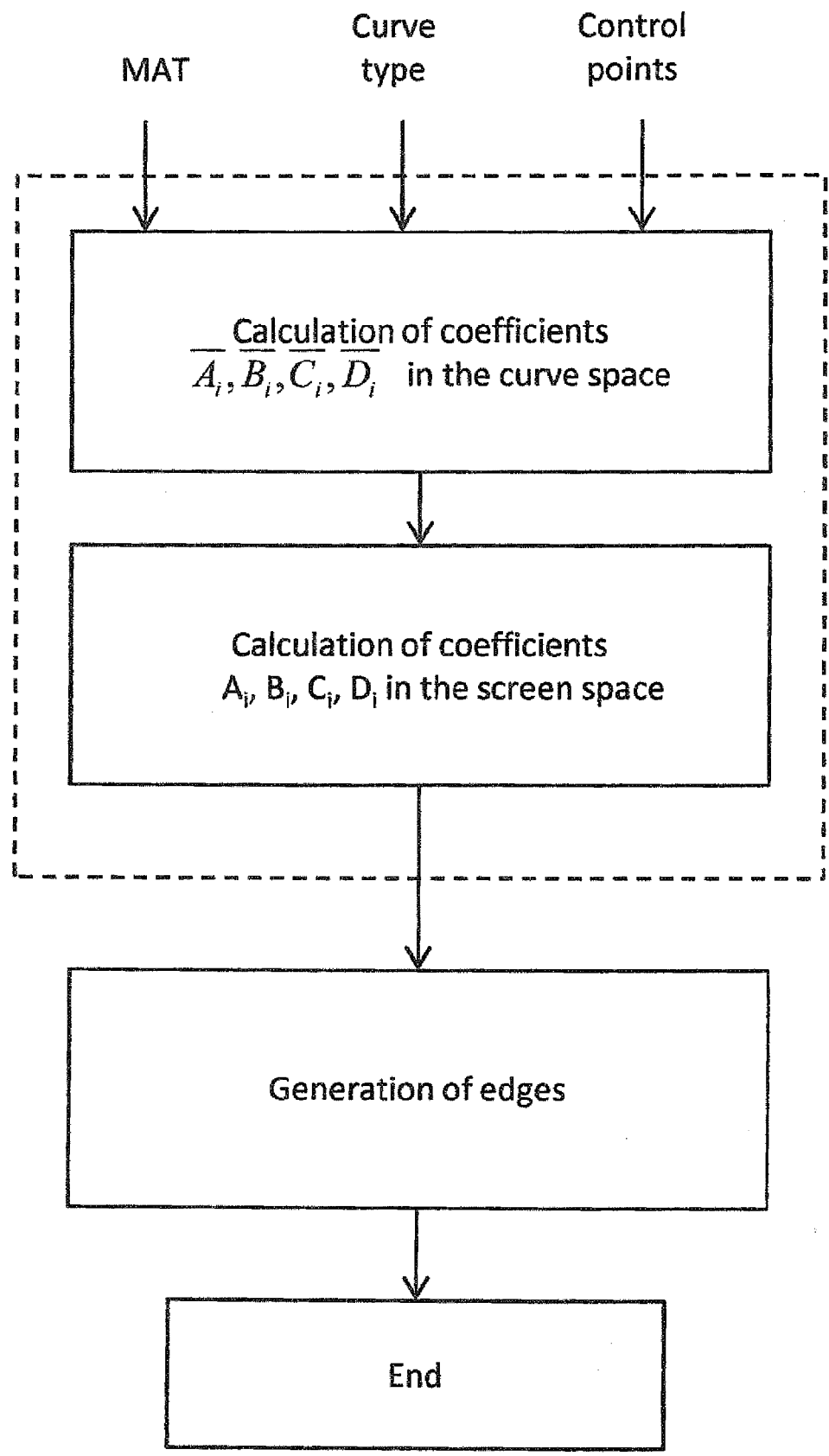
FIG. 7 is a flowchart representing the method according to the disclosure according to another embodiment.

Therefore, in the preferred case in which the adaptive method of the disclosure is applied to a pipeline of the openVG Standard, the set up phase of the method needs to have as inputs the curve to surface matrix MAT defined above, the curve type (Cubic, Quadratic Bezier or Arc Segment) and a well know set of curve control points depending on the particular type of curve under tessellation (FIG. 7).

Therefore, supposing that the general equation of the curve on its curve space reference system is ($t\in[t_0\mathrm{mt}_1]$):

$$x_{curve}(t) = \frac{N_x}{D_w} = \frac{\overline{A_x}t^3 + \overline{B_x}t^2 + \overline{C_x}t + \overline{D_x}}{\overline{A_w}t^3 + \overline{B_w}t^2 + \overline{C_w}t + \overline{D_w}} \quad (1.4)$$

$$y_{curve}(t) = \frac{N_y}{D_w} = \frac{\overline{A_y}t^3 + \overline{B_y}t^2 + \overline{C_y}t + \overline{D_y}}{\overline{A_w}t^3 + \overline{B_w}t^2 + \overline{C_w}t + \overline{D_w}}$$

where $\overline{A_1}, \overline{B_1}, \overline{C_1}, \overline{D_1}$ are the Rational Bezier curve weights, the general equation of the curve on the screen space reference system is:

$$x(t) = \frac{x'(t)}{w'(t)} = \frac{A_x t^3 + B_x t^2 + C_x t + D_x}{A_w t^3 + B_w t^2 + C_w t + D_w} \quad (1.5)$$

$$y(t) = \frac{y'(t)}{w'(t)} = \frac{A_y t^3 + B_y t^2 + C_y t + D_y}{A_w t^3 + B_w t^2 + C_w t + D_w}$$

where, recalling equation (1.3):

$A_x = s_x\overline{A_x} + sh_x\overline{A_y} + t_x\overline{A_w}, B_x = s_x\overline{B_x} + sh_x\overline{B_y} + t_x\overline{B_w}$ $C_x = s_x\overline{C_x} + sh_x\overline{C_y} + t_x\overline{C_w}, D_x = s_x\overline{D_x} + sh_x\overline{D_y} + t_x\overline{D_w}$ $A_y = sh_y\overline{A_x} + s_y\overline{A_y} + t_y\overline{A_w}, B_y = sh_y\overline{B_x} + s_y\overline{B_y} + t_y\overline{B_w}$ $C_y = sh_y\overline{C_x} + s_y\overline{C_y} + t_y\overline{C_w}, D_y = sh_y\overline{D_x} + s_y\overline{D_y} + t_y\overline{D_w}$ $A_w = w_0\overline{A_x} + w_1\overline{A_y} + w_2\overline{A_w}, B_w = w_0\overline{B_x} + w_1\overline{B_y} + w_2\overline{B_w}$ $C_w = w_0\overline{C_x} + w_1\overline{C_y} + w_2\overline{C_w}, D_w = w_0\overline{D_x} + w_1\overline{D_y} + w_2\overline{D_w}$ (1.5a)

The setup phase of the adaptive tessellation method according to the disclosure will now be described for each of the three types of openVG curves.

Quadratic Bezier Curve Setup

A quadratic Bezier curve is defined by three control points $P_0(x_0, y_0), P_1(x_1, y_1)$, and $P_2(x_2, y_2)$ (see FIG. 8). These points are specified in curve space.

Thus a generic point $P(x_{curve}(t), y_{curve}(t))$ is expressed as (where $t\in[0,1]$, hence $t_0=0$ and $t_1=1$):

$x_{curve}(t) = x_0(1-t)^2 + 2x_1(1-t)t + x_2 t^2 = (x_0 - 2x_1 + x_2)t^2 + (2x_1 - 2x_0)t + x_0$ $y_{curve}(t) = y_0(1-t)^2 + 2y_1(1-t)t + y_2 t^2 = (y_0 - 2y_1 + y_2)t^2 + (2y_1 - 2y_0)t + y_0$ Hence, substituting, we have that the coefficients on the curve space are:

$\overline{B_x} = (x_0 - 2x_1 + x_2), \overline{B_y} = (y_0 - 2y_1 + y_2)$ $\overline{C_x} = (2x_1 - 2x_0), \overline{C_y} = (2y_1 - 2y_0)$ $\overline{D_x} = x_0, \overline{D_y} = y_0$ and therefore $x_{curve}(t) = \overline{B_x}t^2 + \overline{C_x}t + \overline{D_x}$ $y_{curve}(t) = \overline{B_y}t^2 + \overline{C_y}t + \overline{D_y}$ Finally, recalling general equation (1.3), it is possible to calculate the screen space curve coefficients, where:

$A_x = 0, B_x = s_x\overline{B_x} + sh_x\overline{B_y}$ $C_x = s_x\overline{C_x} + sh_x\overline{C_y}, D_x = s_x\overline{D_x} + sh_x\overline{D_y} + t_x$ $A_y = 0, B_y = sh_y\overline{B_x} + s_y\overline{B_y}$ $C_y = sh_y\overline{C_x} + s_y\overline{C_y}, D_y = sh_y\overline{D_x} + s_y\overline{D_y} + t_y$ $A_w = 0, B_w = w_0\overline{B_x} + w_1\overline{B_y}$ $C_w = w_0\overline{C_x} + w_1\overline{C_y}, D_w = w_0\overline{D_x} + w_1\overline{D_y} + w_2$ Hence, knowing the control points of the curve in the curve space and the coefficients of transform matrix MAT, it is possible to obtain the coefficients of the curve in the screen space and then to apply equations (1.0) and (1.1) for computing all the points on the curve requested by the algorithm for the generation of the segment lines, or edges, for the approximation of the curve.

It should be noted that, when the transform matrix MAT is affine, then we have $B_w = C_w = 0$ and $D_w = 1$. Considering equation (1.1) we obtain the identity $w'(t) = 1$ and as a consequence equation (1.0) could be simplified as follows $x'(t) = x(t)$ $y'(t) = y(t)$ Therefore, no division is needed to calculate the screen curve points.

Cubic Bezier Curve

A Cubic Bezier curve is defined by four control points $P_0(x_0, y_0), P_1(x_1, y_1), P_2(x_2, y_2)$ and $P_3(x_3, y_3)$ (see FIG. 9). These points are specified in curve space.

Thus a generic point $P(x_{curve}(t), y_{curve}(t))$ is expressed as (where $t\in[0,1]$, hence $t_0=0$ and $t_1=1$):

$x_{curve}(t) = x_0(1-t)^3 + 3x_1(1-t)^2 t + 3x_2(1-t)t^2 + x_3 t^3$ $y_{curve}(t) = y_0(1-t)^3 + 3y_1(1-t)^2 t + 3y_2(1-t)t^2 + y_3 t^3$ Hence, substituting, we have that the coefficients on the curve space are:

$\overline{A_x} = (x_3 + 3x_1 - 3x_2 - x_0), \overline{A_y} = (y_3 + 3y_1 - 3y_2 - y_0)$ $\overline{B_x} = (3x_0 - 6x_1 + 3x_2), \overline{B_y} = (3y_0 - 6y_1 + 3y_2)$ $\overline{C_x} = (3x_1 - 3x_0), \overline{C_y} = (3y_1 - 3y_0)$ $\overline{D_x} = x_0, \overline{D_y} = y_0$ and therefore $x_{curve}(t) = \overline{A_x}t^3 + \overline{B_x}t^2 + \overline{C_x}t + \overline{D_x}$ $y_{curve}(t) = \overline{A_y}t^3 + \overline{B_y}t^2 + \overline{C_y}t + \overline{D_y}$ Finally, recalling general equation (1.3), it is possible to calculate the screen space curve coefficients, where:

$A_x = (s_x\overline{A_x} + sh_x\overline{A_y}), B_x = s_x\overline{B_x} + sh_x\overline{B_y}$ $C_x = s_x\overline{C_x} + sh_x\overline{C_y}, D_x = s_x\overline{D_x} + sh_x\overline{D_y} + t_x$ $A_y = (sh_y\overline{A_x} + s_y\overline{A_y}), B_y = sh_y\overline{B_x} + s_y\overline{B_y}$ $C_y = sh_y\overline{C_x} + s_y\overline{C_y}, D_y = sh_y\overline{D_x} + s_y\overline{D_y} + t_y$ $A_w = (w_0\overline{A_x} + w_1\overline{A_y}), B_w = w_0\overline{B_x} + w_1\overline{B_y}$ $C_w = w_0\overline{C_x} + w_1\overline{C_y}, D_w = w_0\overline{D_x} + w_1\overline{D_y} + w_2$ Hence, knowing the control points of the curve in the curve space and the coefficients of transform matrix MAT, it is possible to obtain the coefficients of the curve in the screen space and then to apply equations (1.0) and (1.1) for computing all the points on the curve requested by the algorithm for the generation of the segment lines, or edges, for the approximation of the curve.

It should be noted that, when the transform matrix MAT is affine, then we have $B_w=C_w=0$ and $D_w=1$. Considering equation (1.1) we obtain the identity $w'(t)=1$ and as a consequence equation (1.0) could be simplified as follows $$x'(t)=x(t)$$

$$y'(t)=y(t)$$

Therefore, no division is needed to calculate the screen curve points.

Arc Segment Curve Setup

A common parameterization of an ellipse is in terms of the ellipse center point (cx, cy), horizontal and vertical radii rh and rv, rotation angle $\Phi$, and starting ending angles $\theta_1$ and $\theta_2$ between 0 and 360 degrees. An ellipse may be viewed as the result of a scale, rotation, and translation applied to the unite circle (see FIG. 10).

Thus, in openVG Standard the elliptical arc may be evaluated in terms of angular parameter $\theta$ that ranges from $\theta_1$ to $\theta_2$. An ellipse in the center parameterization may be viewed as a unit circle, parameterized as $(x_{ellipse}, y_{ellipse})=(\cos(\sigma), \sin(\sigma))=(u(t), v(t))$ that has been placed through an affine transformation comprising a rotation and non-uniform scale:

$$\begin{bmatrix} x_{ellipse} \\ y_{ellipse} \\ 1 \end{bmatrix} = \begin{bmatrix} rh\sin(\phi) & -rv\sin(\phi) & cx \\ rh\cos(\phi) & rv\cos(\phi) & cy \\ 0 & 0 & 1 \end{bmatrix} \begin{bmatrix} u(t) \\ v(t) \\ 1 \end{bmatrix} \quad (1.6)$$

Where u(t) and v(t) are the coordinates of a generic point lying on the unit circle, and therefore satisfy the implicit equation $u^2(t)+v^2(t)=1$.

According to formula (1.0), if we put $x'(t)=(1-t^2)$, $y'(t)=2t$ and $w'(t)=(1+t^2)$, we have $$u(t) = x(t) = \frac{x'(t)}{w'(t)} = \frac{1-t^2}{1+t^2} \quad (1.7)$$

$$v(t) = y(t) = \frac{y'(t)}{w'(t)} = \frac{2t}{1+t^2}$$

Therefore:

$$x^2(t) + y^2(t) = \left(\frac{x'(t)}{w'(t)}\right)^2 + \left(\frac{y'(t)}{w'(t)}\right)^2$$

$$= \left(\frac{1-t^2}{1+t^2}\right)^2 + \left(\frac{2t}{1+t^2}\right)^2$$

$$= \frac{(1-t^2)^2 + (2t)^2}{(1+t^2)^2}$$

$$= \frac{1+t^4-2t^2+4t^2}{1+t^4+2t^2}$$

$$= 1$$

Thus it has been demonstrated that $x^2(t)+y^2(t)=u^2(t)+v^2(t)=1$ for each possible value of t. So it is possible to draw a unit circle using a Rational Bezier of degree 3, running the parameter t in the range $[-\infty,+\infty]$.

Considering all the relationships above, it is possible to draw an arc of an ellipse using a proper Rational Bezier curve of degree 3 representation.

Therefore, advantageously, the tessellation method according to the disclosure performs the tessellation on arc segments exactly in the same way as the tessellation of Bezier Curves. In other words, according to the disclosure, an arc segment curve is transformed into a Rational Bezier curve as described by equations (1.0) and (1.1).

Merging equations (1.2), (1.3), (1.6) and (1.7), it is possible to compute the Rational Bezier curve coefficients as follows:

$$\overline{A_x}=0 \overline{B_x}=(cx-rh\sin(\phi))$$

$$\overline{C_x}=2(-rv\sin(\phi)) \overline{D_x}=(cx+rh\sin(\phi))$$

$$\overline{A_y}=0 \overline{B_y}=(cy-rh\cos(\phi))$$

$$\overline{C_y}=2(rv\cos(\phi)) \overline{D_y}=(cy+rh\cos(\phi))$$

Finally, recalling equations (1.1) and (1.3), it is possible to calculate screen space curve coefficients, where:

$$A_s=0, B_x=s_x\overline{B_x}+sh_x\overline{B_y}+t_x$$

$$C_x=s_x\overline{C_x}+sh_x\overline{C_y}, D_x=s_x\overline{D_x}+sh_x\overline{D_y}+t_x$$

$$A_y=0, B_y=sh_y\overline{B_x}+s_y\overline{B_y}+t_y$$

$$C_y=sh_y\overline{C_x}+s_y\overline{C_y}, D_y=sh_y\overline{D_x}+s_y\overline{D_y}+t_y \quad (1.8)$$

$$A_w=0, B_w=w_0\overline{B_x}+w_1\overline{B_y}+w_2$$

$$C_w=w_0\overline{C_x}+w_1\overline{C_y}, D_w=w_0\overline{D_y}+w_1\overline{D_y}+w_2$$

From equation (1.0) it is possible to directly compute the screen space points over the ellipse having parameter t ranging from $[-\infty,+\infty]$ using equations (1.5).

In particular, parameter t varying from $[-1, +1]$ draws the right side of the unit circle, whereas the left part is drawn varying parameter t from $(-\infty,-1)$ and $(+1,+\infty)$.

Now, it should be noted that in openVG Standard the arc segment is drawn specifying the startPoint $(u_0, v_0)$ over the unit circle from which to start the tessellation and the endpoint $(u_1, v_1)$ to which end-up, plus a direction (clockwise "CW", or counterclockwise "CCW") in which the plotting goes from $(u_0, v_0)$ to $(u_1, v_1)$.

Figure 11:
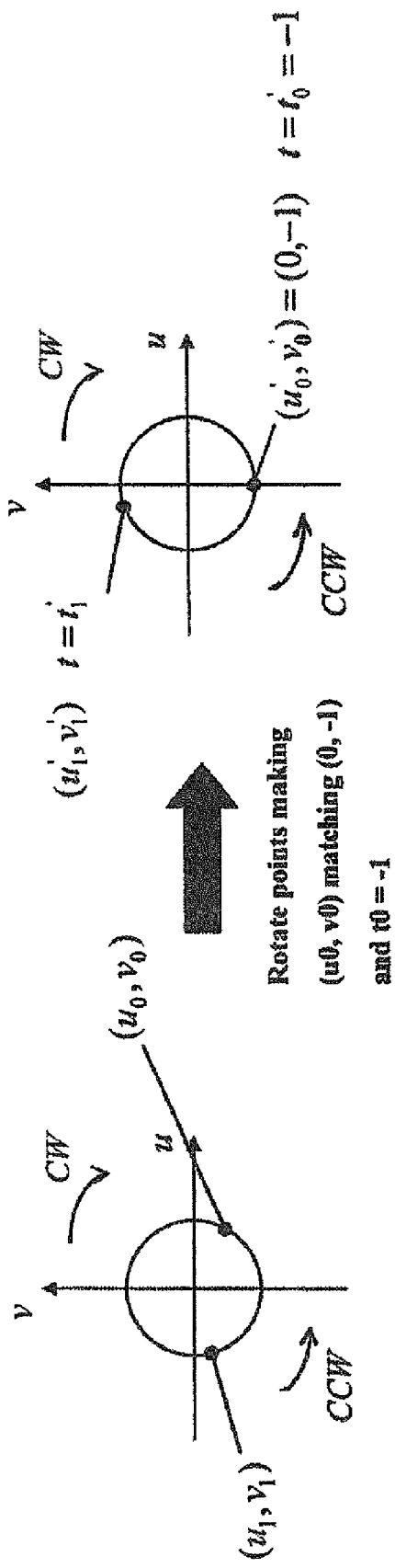
FIG. 11 shows a Unit Circle initial rotation.

Therefore, a further step of the set-up phase of the tessellation method according to the disclosure is to map the startPoint $(u_0, v_0)$ and endpoint $(u_1, v_1)$ over the unit circle into new startPoint $(u'_0, v'_0)$ and new endpoint $(u'_1, v'_1)$ for a correct application of the Rational Bezier curve (1.7), in which parameter t ranges from $[-\infty,+\infty]$. For doing so, the arc segment described by given points startPoint $(u_0, v_0)$ and endpoint $(u_1, v_1)$ over the unit circle must be clockwise rotated of a certain amount so that: $(u'_0, v'_0)$ is always mapped to point $(0, -1)$. It could be noted that, according to the Rational Bezier curve of equation (1.7), point $(0, -1)$ is obtained with $t=t'_0=-1$ (FIG. 11). Hence the initial rotation is required to normalize the arc segment over the unit circle as starting always from point $(0, -1)$, $t_0=-1$ and going up to transformed point $(u_1, v_1)$ with $t'_1$ to be properly estimated according to the algorithm described in FIGS. 13-14 that is part of the present method.

The rotation is:

$$\begin{bmatrix} u' \\ v' \end{bmatrix} = \begin{bmatrix} -v_0 & u_0 \\ -u_0 & -v_0 \end{bmatrix} \begin{bmatrix} u \\ v \end{bmatrix}$$

Hence:

$$\begin{bmatrix} u'_0 \\ v'_0 \end{bmatrix} = \begin{bmatrix} 0 \\ -1 \end{bmatrix} \begin{bmatrix} -v_0 & u_0 \\ -u_0 & -v_0 \end{bmatrix} \begin{bmatrix} u_0 \\ v_0 \end{bmatrix} \quad (1.9)$$

$$\begin{bmatrix} u'_1 \\ v'_1 \end{bmatrix} = \begin{bmatrix} -v_0 & u_0 \\ -u_0 & -v_0 \end{bmatrix} \begin{bmatrix} u_1 \\ v_1 \end{bmatrix}$$

As a final step of the setup phase it is necessary to estimate the parameter $t'_1$ for which formula (1.7) maps the point exactly to point $(u'_1, v'_1)$ onto the unite circle. Observing FIG. 11, two cases are possible:
1) transformed point $(u'_1, v'_1)$ lies on the right-side of unit circle;
2) transformed point $(u'_1, v'_1)$ lies on the left-side of unit circle.

According to one embodiment of the disclosure, the algorithm used to estimate parameter $t'_1$ is based on a fixed iterative parametric convergent search.

FIGS. 13A and 13B show an example of such algorithm, implemented for example using a C-like programming language. Inputs parameters are points $(u_0, v_0)$, $(u_1, v_1)$ and a flag "CW" indicating if we are moving from startPoint $(u_0, v_0)$ to endpoint $(u_1, v_1)$ on clockwise (CW=true) or counterclockwise (CW=false).

The output of the algorithm is an accurate estimation of the parameter $t'_1$ of the endpoint $(u_1, v_1)$. It should be noted that if the rotated endPoint $(u_1, v_1)$ lies on right-side of the unit Circle (see case 1) than it is clear that $t'_1 \in (-1,1]$, otherwise we can say that $t'_1 \in (1,3]$ to say that the rotated point lies on the left side of the unit circle.

Now it will be described how the iterative algorithm is able to give an accurate estimation of the parameter $t'_1 \in (1,3]$ that satisfies equation (1.7) so that:

$$u(t'_1) = x(t'_1) = \frac{x'(t'_1)}{w'(t'_1)} = \frac{1 - (t'_1)^2}{1 + (t'_1)^2}$$

Suppose that the initial rotation (1.9) of the two points $(u_0, v_0)$ and $(u_1, v_1)$ has been already done. So initially we have two rotated points lying on the unit circle so that $(u'_0, v'_0) = (0, -1)$ and $(u'_1, v'_1)$ value known, but with its parameter $t'_1$ to be estimated in order to let the tessellation core algorithm to properly tessellate the arc segment according to the Rational Bezier formula having screen coefficients calculated as per formula (1.8).

First thing to handle is, according to the inputs of the algorithm, if we are moving from point $(u'_0, v'_0)$ to $(u'_1, v'_1)$ clockwise (CW=true) or counterclockwise (CW=false).

Figure 12:
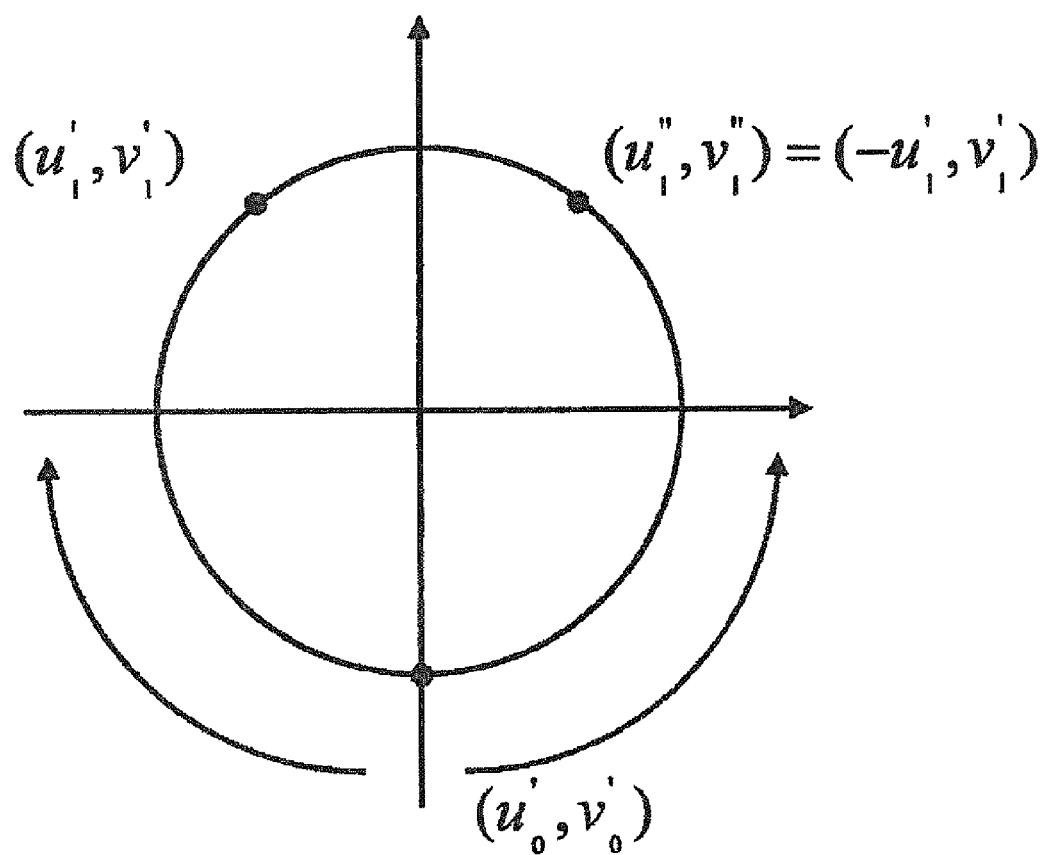
FIG. 12 shows another step of the set up phase for the tessellation of an arc segment curve.

According to one embodiment, the algorithm that estimates $t'_1$ works supposing a counterclockwise direction. Instead, if we are moving clockwise, it is straightforward to demonstrate that moving from $(u'_0, v'_0)$ to $(u'_1, v'_1)$ clockwise is exactly the same as moving from $(u'_0, v'_0)$ to $(u''_1, v''_1) = (-u'_0, v'_0)$ following a counterclockwise direction (FIG. 12).

Figure 14A:
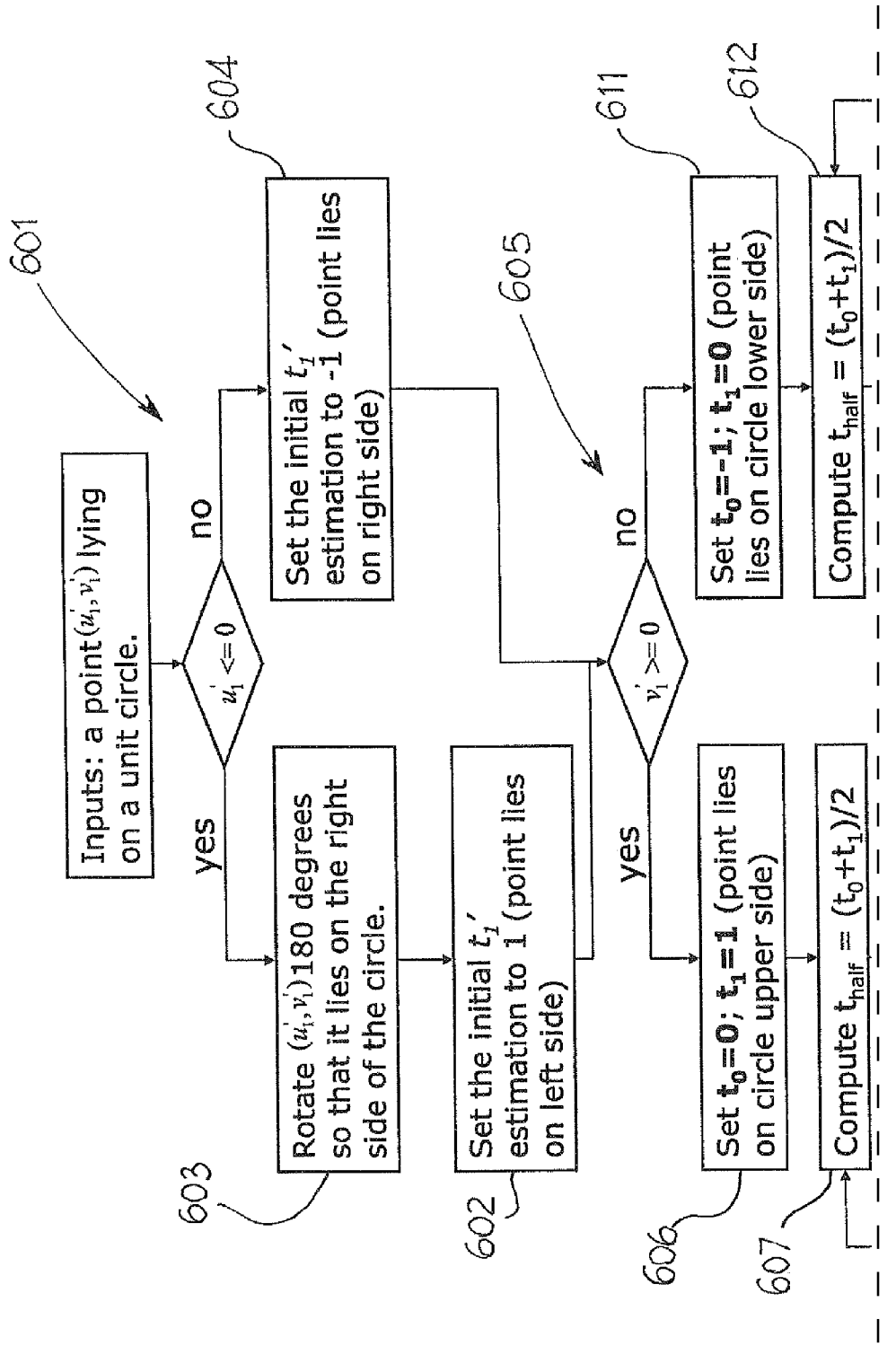
FIGS. 14A and 14B are a flowchart for the estimation of the Arc Segment endpoint.
Figure 14B:
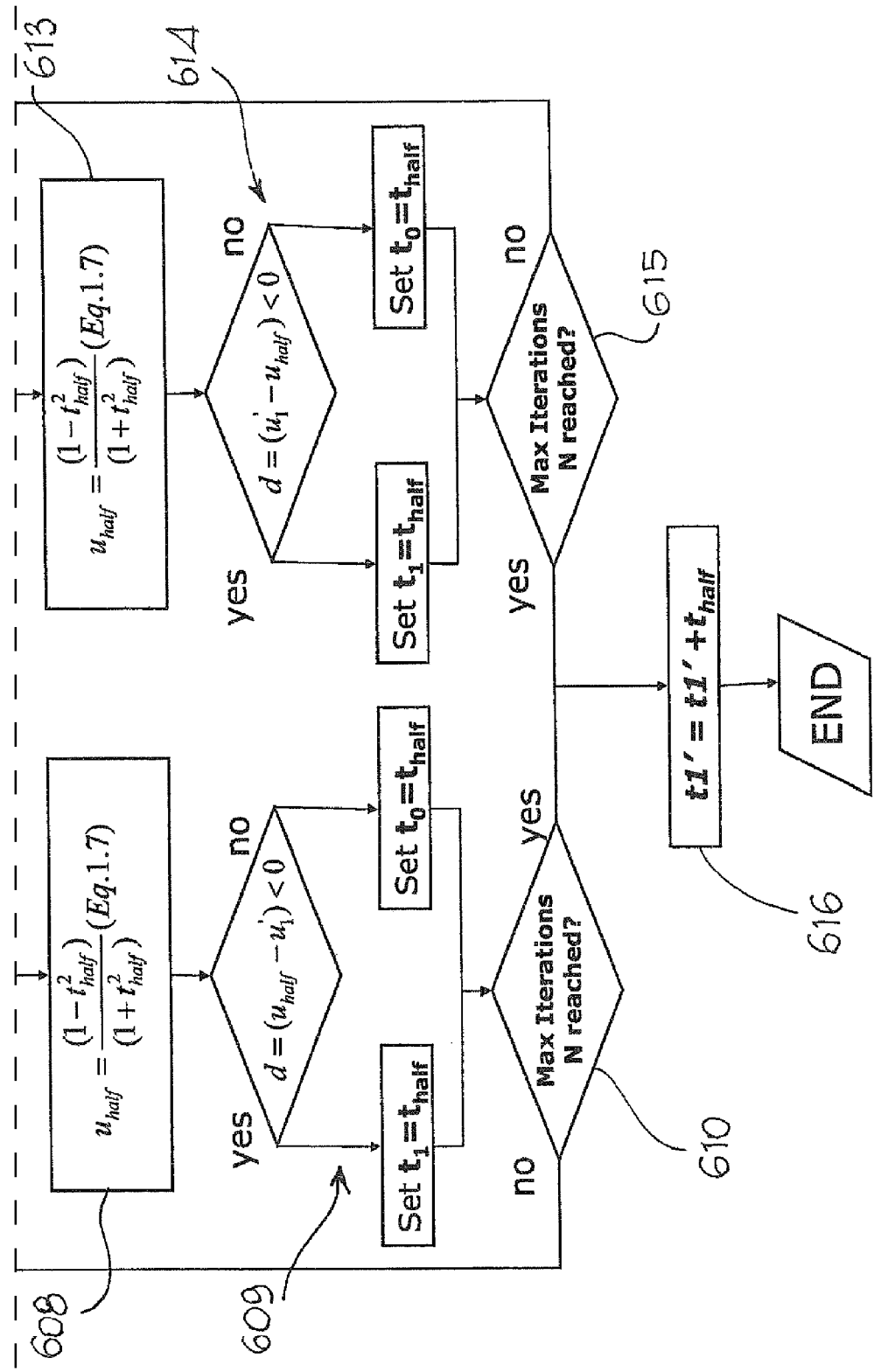

Now the estimation of $t'_1$ could be done safely supposing always a counterclockwise direction according to the flowchart diagram of FIGS. 14A and 14B:

As a first step 601, the algorithm checks if $u_1' \leq 0$. If $u_1' \leq 0$, then it means that the endpoint $(u1', v1')$ lies on the left side of the circle and that $t1'$ is in the range $(1, 3]$. Therefore, $t1'$ is initially estimated with the value 1 (step 602). Endpoint $(u1', v1')$ is rotated of 180 degrees so that it lies on the right side of the circle (step 603).

If $u1'>0$, then it means that the endpoint $(u1', v1')$ lies on the right side of the circle and that $t1'$ is in the range $(-1, 1]$. Therefore, $t1'$ is initially estimated with the value $-1$ (step 604).

In a next step 605, the algorithm checks if $v_1' \geq 0$.

If $v_1' \geq 0$, then it means that the endpoint $(u_1', v_1')$ lies on the circle upper side, so that the algorithm sets $t_0=0$ and $t_1=1$ (step 606). Then, $t_{half}=(t_0+t_1)/2$ is computed (step 607). It is thus possible to calculate (step 608):

$$u_{half} = \frac{1 - t_{half}^2}{1 + t_{half}^2},$$

according to equation (1.7).

If $u_{half} < u_1'$, then the algorithm sets $t_1 = t_{half}$ otherwise it sets $t_0 = t_{half}$ (step 609). At this point, steps 607-609 are iterated in such a way to perform a convergent search of $t_1'$, until a pre-established number N of iterations is reached (step 610).

If $v_1' < 0$, then it means that the endpoint $(u_1', v_1')$ lies on the circle lower side, so that the algorithm sets $t_0 = -1$ and $t_1 = 0$ (step 611). Then, $t_{half}=(t_0+t_1)/2$ is computed (step 612). It is thus possible to calculate (step 613)

$$u_{half} = \frac{1 - t_{half}^2}{1 + t_{half}^2},$$

according to equation (1.7).

If $u_1' < u_{half}$, than the algorithm sets $t_1 = t_{half}$ otherwise it sets $t_0 = t_{half}$ (step 614). At this point, steps 612-614 are iterated in such a way to perform a convergent search of $t_1'$, until a pre-established number N of iterations is reached (step 615).

The final estimation of $t_1'$ is equal to the initial estimation of $t_1'$ plus the last value of $t_{half}$ (step 616).

After the estimation of parameter $t'_1$, it is possible to tessellate accurately the Arc Segment as if it is a Rational Bezier Curve of degrees 3, using screen coefficients as computed in equation (1.8). The only difference compared to tessellation of Bezier Curves is that when the rotated endPoint lies on the left-side of the unit circle it is necessary to first tessellate the right-side of the Arc Segment (i.e., tessellate the whole curve with a $t'_1 \in [-1,+1]$, then clockwise rotate 180 degrees the left-side of the remaining portion of the Arc Segment so that we have again that this remaining portion to tessellate of the Arc Segment is mapped again on the range $t'_1 \in [-1,+1]$.

Therefore, it has been demonstrated that the adaptive tessellation method according to the disclosure is a general purpose method that allows an efficient implementation because the same algorithm is reused to tessellate several curves: Cubic/Quadratic Bezier, Arc Curves, eventually every kind of Rational Bezier Curve of degree 3 (not actually defined by OpenVG Standard), only avoiding at all the setup phase, but specifying the curve coefficients of the Rational Bezier Curve directly. Only the calculation of the transformed screen coefficients is thus needed in this case.

Only the set-up phase is different among the different types of curves. Once the coefficients $A_1$, $B_1$, $C_1$, $D_1$ (used in the general formula) have been computed according to the curve type and transformed screen surface coefficients $\overline{A_1}$, $\overline{B_1}$, $\overline{C_1}$, $\overline{D_i}$ are calculated, it is possible to apply exactly the same algorithm. For this reason, advantageously, at least the core computation of the points on the curve which leads to the generation of the edges can be implemented by means of an hardware circuitry effectively implementing a unified general Rational Bezier of degree 3 Adaptive Tessellation and perspective transformation.

Since the above coefficients are computed according to the (perspective) surface transform, the method always achieves the desired quality expressed in term of the thresholds THR0 and THR1 used, together with a minimal number of edges generated.

Figure 15:
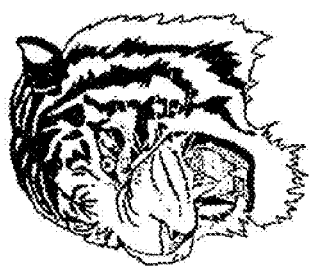
FIG. 15 is a table reporting the results of a test for evaluating the tessellation method according to the disclosure.

FIG. 15 shows the results of a test carried out for properly evaluating the proposed tessellation method. A well-know OpenVG application called "Tiger" has been used. This is a meaningful application because it stresses the tessellation algorithm since the Tiger is obtained with several strokes of the Bezier curves. The target resolution used on this comparison was VGA (480×640).

To properly evaluate the performances of the proposed method, it has been compared with the fixed tessellator used by OpenVG reference implementation, as it was released by Khronos Group (Fixed Tessellation on FIG. 10) and with a reference adaptive tessellator based on a single threshold evaluation.

As an evaluation of the overall performances, some measure was accounted. In particular, the effort required to render a single frame picture of the Tiger Sample Application at VGA resolution (640×480) was analyzed.

Basically, the number of tessellated edges produced by each tessellation method was measured and the cost ("Iterations Done" field) to obtain such edges (i.e., the number of times equation (1.5) was calculated).

Third column ("Ratio" field) is computed as the ratio between the "Iterations Done" and "Tessellated Edges" fields. This gives an idea of the "effort" required (in term of computational complexity) to produce, on average, a single edge. According to FIG. 5, last two columns give an idea of how many times on average the analyzed methods sent to the rasterizer the single edge labeled as "C", and how many times it sent a pair of edges labeled "A" and "B". It should be noted that traditional methods based on fixed or single threshold tessellation always sent 100% of times edge "C".

First thing to note is the large gap existing between a fixed tessellator and an adaptive one: a fixed one produces on TestTiger around 10,000,000 edges, whereas an adaptive one around 200,000/300,000 maximum. Since the number of edges contributes linearly to the work of the rasterizer, the advantage of using an adaptive method is clear. The same is true considering that the complexity of the tessellation phase is decreased accordingly, considering that equation (1.5a) is evaluated substantially less on the proposed adaptive method.

Moreover, comparing traditional adaptive methods based on single threshold evaluation with the method according to the disclosure, which utilizes two thresholds THR0 and THR1, it is clear that the efficiency of the algorithm proposed is much greater than traditional ones. In fact the effort required to produce a single edge ("Ratio" field) is equal to 1.7 on traditional methods, whereas in the method according to the disclosure this measure lowers to only 1.2. This means that, on average, there is less computation to do on equation (1.5a) having roughly the same amount of edges produced (i.e., the same global quality). On the other side, if there is a certain amount of computational power P, the method of the disclosure produces a higher number of edges, thus it gives a higher quality of perceived curve display on the display screen. As a last advantage of adaptive methods in general, they are fully scalable in their performance, simply doing a turning on threshold values THR0 and THR1. This provides for an effective balancing between resources available on the target device and the desired quality of the line or curve display on the display screen.

CONCLUSIONS

The solution hereby described has been proved to pass all the 1.0 OpenVG conformance tests. It is able effectively to decrease the number of tessellates edges compared to the reference tessellator implemented in the OpenVG 1.0 standard (that is standard 256 fixed steps tessellator).

Moreover it is able to obtain the same quality of traditional adaptive methods that are based on a single threshold and at a lower complexity (number of computed screen-points, see equation (1.5a)), or at the same complexity a higher level of detail (that is, number of edges). Moreover, the proposed method is highly recommended for an efficient hardware implementation since the proposed tessellation algorithms are somewhat "general-purpose". In fact, it is able to correctly tessellate Quadratic/Cubic Bezier Curves and Arc Segments as described by openVG Standard. Plus, as an extension, it is able to correctly tessellate Rational Bezier Curves UP to degree 3. As a last advantage the proposed methods tessellate the curve by evaluating the distance function into the surface space directly. Hence, it produces a tessellation that is always optimal with respect of the current zoom factor/perspective local distortion applied to the curve. Thus, it produces the minimum required amount of edges to obtained a well defined tessellation quality according to the threshold set.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for adaptive tessellation of a curve $P(x,y)=P(x(t), y(t))$ between two points $P_0(x,y)=P_0(x(t_0), y(t_0))$ and $P_1(x,y)=P_1(x(t_1), y(t_1))$ for visual display on an electronic display screen having display pixels, comprising:

defining two thresholds THR0 and THR1 in terms of a pixel on the display screen, with THR0<=THR1;

computing a curve mid-point $P_{half}(x,y)=P_{half}(x(t_{half}), y(t_{half}))$, where $t_{half}=((t_0+t_1)/2$ on the curve;

computing a segment mid-point $P_M(x,y)=(P_0(x,y)+P_1(x,y))/2$ on segment $\overline{P_0P_1}$;

computing a distance function d between said curve mid-point and said segment mid-point;

if d<THR0, then generating line segment $\overline{P_0P_1}$ is generated for display on display screen;

if THR0<=d<THR1, then generating two line segments $\overline{P_0P_{half}}$ and $\overline{P_{half}P_1}$ for display on the display screen; and if d>=THR1, then repeating the computing steps and the generating steps for a first curve portion $P_0$ to $P_{half}$ and for a second curve portion from $P_{half}$ to $P_1$.

2. The method of claim 1 wherein the distance function d is a square distance function to determine a single distance value $d=(P_{half}-P_M)^2=(x(t_{half})-P_{Mx})^2+(y(t_{half})-P_{My})^2$, where $P_{Mx}$ and $P_{My}$ are the x and y coordinates of the segment mid-point $P_M$.

3. The method of claim 1 where the curve $P(x,y)=P(x(t), y(t))$ is a curve on a screen space of the display screen.

4. The method of claim 3, comprising a set-up phase that includes computing screen space coefficients of the curve starting from given coefficients of the curve in a curve coordinates space.

5. The method of claim 4 wherein the curve in the screen space is a Rational Bezier Curve of degree 3 representing a whole set of curves defined as:

$$x(t)=x''(t)/w''(t); y(t)=y''(t)/w''(t),$$

where $$x'(t)=A_x t^3+B_x t^2+C_x t+D_x [t\epsilon_0,t_1]$$

$$y'(t)=A_y t^3+B_y t^2+C_y t+D_y t\epsilon[t_0,t_1]$$

$$w'(t)=A_w t^3+B_w t^2+C_w t+D_w t\epsilon[t_0,t_1]$$

6. The method of claim 5 wherein, given a generic point $P(x_{curve}(t), y_{curve}(t))$ of the curve expressed in curve coordinates, obtaining a corresponding point in screen space coordinates as:

$$P(x(t),y(t))=P(x'(t)/w'(t),y'(t)/w'(t)),$$

where $$\begin{bmatrix} x'(t) \\ y'(t) \\ w'(t) \end{bmatrix} = \begin{bmatrix} s_x & sh_x & t_x \\ sh_y & s_y & t_y \\ w_0 & w_1 & w_2 \end{bmatrix} \begin{bmatrix} x_{curve}(t) \\ y_{curve}(t) \\ 1 \end{bmatrix}$$

and where $s_x$ and $s_y$ are values controlling (on x and y coordinates) scaling of the curve, $sh_x$ and $sh_y$ are shearing coefficients of the curve, $t_x$ and $t_y$ are translation coefficients (along the x and y axes respectively, and $w_0$, $w_1$ and $w_2$ are coefficients that control perspective mapping.

7. The method of claim 6 wherein a set up phase for tessellation of an elliptical arc segment curve specified by a startPoint $(u_0, v_0)$ and by an endPoint $(u_1, v_1)$ over a unit circle, and by a clockwise or counterclockwise direction, comprises:

transforming the elliptical arc segment curve in a Rational Bezier curve $$x_{curve}(t) = \frac{N_x}{D_w} = \frac{\overline{A_x}t^3 + \overline{B_x}t^2 + \overline{C_x}t + \overline{D_x}}{\overline{A_w}t^3 + \overline{B_w}t^2 + \overline{C_w}t + \overline{D_w}}$$

$$y_{curve}(t) = \frac{N_y}{D_w} = \frac{\overline{A_y}t^3 + \overline{B_y}t^2 + \overline{C_y}t + \overline{D_y}}{\overline{A_w}t^3 + \overline{B_w}t^2 + \overline{C_w}t + \overline{D_w}}$$

with curve coefficients:

$$\overline{A_x}=0 \; \overline{B_x}=(cx-rh\sin(\phi))$$

$$\overline{C_x}=2(-rv\sin(\phi)) \; \overline{D_x}=(cx+rh\sin(\phi))$$

$$\overline{A_y}=0 \; \overline{B_y}=(cy-rh\cos(\phi))$$

$$\overline{C_y}=2(rv\cos(\phi)) \; \overline{D_y}=(cy+rh\cos(\phi));$$

calculating screen space curve coefficients according to formula:

$$\begin{bmatrix} x'(t) \\ y'(t) \\ w'(t) \end{bmatrix} = \begin{bmatrix} s_x & sh_x & t_x \\ sh_y & s_y & t_y \\ w_0 & w_1 & w_2 \end{bmatrix} \begin{bmatrix} x_{curve}(t) \\ y_{curve}(t) \\ 1 \end{bmatrix}$$

mapping the startPoint $(u_0, v_0)$ and endPoint $(u_1, v_1)$ over the unit circle into new startPoint $(u'_0, v'_0)$ and new endPoint $(u'_1, v'_1)$ by rotating the elliptical arc segment curve over the unit circle so that $(u'_0, v'_0)$ is always mapped to point $(0, -1)$, $t'_0=-1$; and estimating parameter $t'_1$ associated with endPoint $(u'_1, v'_1)$.

8. The method of claim 7 wherein estimating t1' includes performing a fixed iterative convergent search that initially assigns t1' to value 1 or −1, depending if the rotated endpoint $(u_1 \; v_1')$ lies on the left or on the right side of the unit circle.

9. The method of claim 1, comprising defining the two thresholds THR0 and THR1 to be in a range of a fraction of one or more pixels on the display screen.

10. A tessellation module implemented in a computer for generating a display on a display screen, comprising: a calculation apparatus adapted for:

computing a curve mid-point $P_{half}(x,y)=P_{half}(x(t_{half}), y(t_{half}))$, where $t_{half}=((t_0+t_1)/2$ on the curve;

computing a segment mid-point $P_M(x,y)=(P_0(x,y)+P_1(x, y))/2$ on segment $\overline{P_0P_1}$;

computing a distance function to determine a single distance value d between said curve mid-point and said segment mid-point; and, given two thresholds THR0 and THR1, with THR0<=THR1, if d<THR0, generating line segment $\overline{P_0P_1}$;

if THR0<=d<THR1, generating two line segments $\overline{P_0P_{half}}$ and $\overline{P_{half}P_1}$;

if d>=THR1, repeating the computing steps and the generating steps for a first curve portion from $P_0$ to $P_{half}$ and a second curve portion from $P_{half}$ to $P_1$.

11. The tessellation module of claim 10 wherein said calculation apparatus is configured to compute the single distance value function d as a square distance function $d=(P_{half}-P_M)^2=(x(t_{half})-P_{MX})^2+(y(t_{half})-P_{My})^2$, where $P_{Mx}$ and $P_{My}$ are x and y coordinates of the segment mid-point $P_M$.

12. The tessellation module of claim 10 wherein said calculation apparatus is configured to compute coefficients of the curve in a screen space starting from the coefficients of the curve in a curve coordinates space.

13. The tessellation module of claim 10 wherein said calculation apparatus is configured to calculate curve coefficients of a Rational Bezier curve of degree 3 starting from an elliptical arc segment curve, to calculate corresponding screen curve coefficients, to rotate the arc segment over a unit circle so that the starting point of the elliptical arc segment curve is always mapped to point $(0, -1)$, $t'_0=-1$, and to estimate parameter $t'_1$ associated with a rotated end point of the arc segment over the unit circle.

14. The method of claim 10, comprising defining the two thresholds THR0 and THR1 to be in a range of one or more pixels on the display screen.

15. A graphic module, comprising:
a driver configured to accept commands from a program implemented in a computer processor for driving a display screen;
a path stage block, including a tessellation module configured to approximate curve specified by the program with a set of primitives in rectilinear segments; and
a rasterizer module arranged downstream of said path stage block and configured to acquire from the path stage block primitive coordinates and to associate the primitives coordinates to pixels of the screen, and in which the curve is a curve $P(x,y)=P(x(t), y(t))$ which is between two points $P_0(x,y)=P_0(x(t_0), y(t_0))$ and $P_1(x,y)=P_1(x(t_1), y(t_1))$, in screen coordinates, the tessellation module including:
a first calculating circuit configured to compute screen space coefficients of the curve starting from given coefficients of the curve in a curve coordinates space so that the curve in a screen space to be tessellated is represented as a Rational Bezier Curve of degree 3; and
a second calculating circuit configured to:
compute a curve mid-point $P_{half}(x,y)=P_{half}(x(t_{half}), y(t_{half}))$, where $t_{half}=(t_0+t_1)/2$ on the curve;
compute a segment mid-point $P_M(x,y)=(P_0(x,y)+P_1(x,y))/2$ on segment $\overline{P_0P_1}$;
compute a distance function to determine a single distance value d between said curve mid-point and said segment mid-point and, given two thresholds THR0 and THR1, with THR0<=THR1,
if d<THR0, generate line segment $\overline{P_0P_1}$;
if THR0<=d<THR1, generate two line segments $\overline{P_0P_{half}}$ and $\overline{P_{half}P_1}$;
if d>=THR1, compute a curve mid-point, compute a segment mid-point, compute the distance function d, and generate a line segment or two line segments for a first curve portion from $P_0$ to $P_{half}$ and a second curve portion from $P_{half}$ to $P_1$.

16. The graphic module of claim 15 wherein at least the second calculating circuit is hardware implemented by an electronic circuit.

17. The method of claim 15, comprising defining the two thresholds THR0 and THR1 to be a range of one or more pixels on the display screen.

18. A system, comprising:
a display screen; and
a graphic module that includes:
a driver configured to accept commands from a program implemented in a computer processor,
a path stage block, including a tessellation module for approximating a curve specified by the program with a set of primitives in rectilinear segments, and
a rasterizer module arranged downstream of said path stage block and configured to acquire from the path stage block primitive coordinates and to associate the primitives coordinates to pixels of the screen, and in which the curve is a curve $P(x,y)=P(x(t), y(t))$ which is between two points $P_0(x,y)=P_0(x(t_0), y(t_0))$ and $P_1(x,y)=P_1(x(t_1), y(t_1))$, in the screen coordinates, the tessellation module including:
a first calculating circuit configured to compute screen space coefficients of the curve starting from given coefficients of the curve in a curve coordinates space so that the curve in a screen space to be tessellated is represented as a Rational Bezier Curve of degree 3; and
a second calculating circuit configured to:
compute a curve mid-point $P_{half}(x,y)=P_{half}(x(t_{half}), y(t_{half}))$, where $t_{half}=((t_0+t_1)/2$ on the curve;
compute a segment mid-point $P_M(x,y)=(P_0(x,y)+P_1(x,y))/2$ on segment $\overline{P_0P_1}$;
compute a distance function to determine a single distance value d between said curve mid-point and said segment mid-point; and, given two thresholds THR0 and THR1, with THR0<=THR1,
if d<THR0, generate line segment $\overline{P_0P_1}$;
if THR0<=d<THR1, generate two line segments $\overline{P_0P_{half}}$ and $\overline{P_{half}P_1}$; and
if d>=THR1, compute a curve mid-point, compute a segment mid-point, compute the distance function d, and generate a line segment or two line segments for a first curve portion from $P_0$ to $P_{half}$ and a second curve portion from $P_{half}$ to $P_1$.

19. The system of claim 18 wherein the second calculating circuit is configured to calculate curve coefficients of a Rational Bezier curve of degree 3 starting from an elliptical arc segment curve, calculate corresponding screen curve coefficients, rotate the arc segment curve over a unit circle so that a starting point of the arc segment curve is always mapped to point (0, −1), $t'_0=-1$, and estimate a parameter $t'_1$ associated with a rotated end point of the arc segment over the unit circle.

* * * * *

UNITED STATES PATENT AND TRADEMARK OFFICE
CERTIFICATE OF CORRECTION

PATENT NO. : 8,373,702 B2
APPLICATION NO. : 12/466784
DATED : February 12, 2013
INVENTOR(S) : Mirko Falchetto It is certified that error appears in the above-identified patent and that said Letters Patent is hereby corrected as shown below:

Title Page, Item (57), Abstract:

"A graphic module wherein, given a curve $P(x,y) = P(x(t),y(t))$ between two points $P_0(x,y) = P_0(x(t_0))$ and $P_1(x,y) = P_1(x(t_1), y(t_1))$, in the screen coordinates, a calculating circuit computes a curve mid-point $P_{half}(x,y) = P_{half}(x(t_{half}), y(t_{half}))$, where $t_{half} = (t_0+t_1)/2$ on the curve, computes a segment mid-point $P_M(x,y) = (P_0(x,y) + P_1(x,y))/2$ on segment $\overline{P_0 P_1}$, computes a distance function $d$ between the curve mid-point and the segment mid-point, and, given two thresholds THR0 and THR1, with THR0<=THR1, if $d <$ THR0, it generates line segment $\overline{P_0 P_1}$, and if THR0 <= $d <$ THR1, it generates two line segments $\overline{P_0 P_{half}}$ and $\overline{P_{half} P_1}$, and if $d >=$ THR1, it repeats the previous steps for the curve portions from $P_0$ to $P_{half}$ and from $P_{half}$ to $P_1$." should read, --A graphic module wherein, given a curve $P(x,y) = P(x(t),y(t))$ between two points $P_0(x,y) = P_0(x(t_0))$ and $P_1(x,y) = P_1(x(t_1), y(t_1))$, in the screen coordinates, a calculating circuit computes a curve mid-point $P_{half}(x,y) = P_{half}(x(t_{half}), y(t_{half}))$, where $t_{half} = ((t_0+t_1)/2$ on the curve, computes a segment mid-point $P_M(x,y) = (P_0(x,y) + P_1(x,y))/2$ on segment $\overline{P_0 P_1}$, computes a distance function $d$ between the curve mid-point and the segment mid-point, and, given two thresholds THR0 and THR1, with THR0<=THR1, if $d <$ THR0, it generates line segment $\overline{P_0 P_1}$, and if THR0 <= $d <$ THR1, it generates two line segments $\overline{P_0 P_{half}}$ and $\overline{P_{half} P_1}$, and if $d >=$ THR1, it repeats the previous steps for the curve portions from $P_0$ to $P_{half}$ and from $P_{half}$ to $P_1$.--.

In the Claims

Column 15, Lines 1-2:
"if d<THR0, then generating line segment $\overline{P_0 P_1}$ is generated for display on display screen;" should read, --if d<THR0, then generating line segment $\overline{P_0 P_1}$ for display on the display screen;--.

Column 15, Line 6:
"generating steps for a first curve portion $P_0$ to $P_{half}$ and" should read, --generating steps for a first curve portion from $P_0$ to $P_{half}$ and--.

Signed and Sealed this
Third Day of September, 2013

Teresa Stanek Rea
*Acting Director of the United States Patent and Trademark Office*

CERTIFICATE OF CORRECTION (continued)

U.S. Pat. No. 8,373,702 B2

Page 2 of 3

Column 15, Line 23:
"$x(t)=x''(t)/w''(t); y(t)=y''(t)/w''(t),$" should read, --$x(t) = x'(t)/w'(t); y(t) = y'(t)/w'(t)$,--.

Column 15, Line 27:
"$x'(t)=A_x t^3+B_x t^2+C_x t+D_x [t\epsilon_0 t_1]$" should read, --$x'(t)=A_x t^3+B_x t^2+C_x t+D_x \ t\epsilon[t_0 t_1]$--.

Column 15, Line 29:
"$y'(t)=A_y t^3+B_y t^2+C_y t+D_y t\epsilon[t_0 t_1]$" should read, --$y'(t)=A_y t^3+B_y t^2+C_y t+D_y \ t\epsilon[t_0 t_1]$--.

Column 15, Line 31:
"$w'(t)=A_w t^3+B_w t^2+C_w t+D_w t\epsilon[t_0 t_1]$" should read, --$w'(t)=A_w t^3+B_w t^2+C_w t+D_w \ t\epsilon[t_0 t_1]$--.

Column 16, Line 3:
"$\overline{A_x}=0 \ \overline{B_x}=(cx-rh\sin(\phi)$" should read, --$\overline{A_x}=0 \quad \overline{B_x}=(cx-rh\sin(\phi))$--.

Column 16, Line 5:
"$\overline{C_x}=2(-rv\sin(\phi) \ \overline{D_x}=(cx+rh\sin(\phi))$" should read, --$\overline{C_x}=2(-rv\sin(\phi)) \ \overline{D_x}=(cx+rh\sin(\phi))$--.

Column 16, Line 9:
"$\overline{C_y}=2(rv\cos(\phi) \ \overline{D_y}=(cy+rh\cos(\phi));$" should read, --$\overline{C_y}=2(rv\cos(\phi)) \ \overline{D_y}=(cy+rh\cos(\phi));$--.

Column 16, Line 52:
"value function d as a square distance function" should read, --value $d$ as a square distance function--.

Column 16, Line 57:
"the curve in a screen space starting from the coefficients of the" should read, --the curve in a screen starting from coefficients of the--.

Column 17, Lines 9-10:
"to approximate curve specified by the program with a set of primitives in rectilinear segments; and" should read, --to approximate a curve specified by the program with a set of primitives of rectilinear segments; and--.

Column 17, Lines 27-28:
"compute a segment mid-point $P_M(x,y)=(P_0(x,y)+P_1(x,y))/2$ on segment" should read, --compute a segment mid-point $P_M(x,y)=(P_0(x,y)+P_1(x,y))/2$ on segment $\overline{P_0 P_1}$ ;--.

Column 17, Line 31:
"segment mid-point and, given two thresholds THR0" should read, --segment mid-point; and, given two thresholds THR0--.

Column 18, Line 6:

"a path stage block, including a tessellation module for" should read, --a path stage block including a tessellation module for--.

Column 18, Line 15:

"$P_1(x,y)=P_1(x(t_1), y(t_1)$, in the screen coordinates" should read, --$P_1(x,y)=P_1(x(t_1), y(t_1))$, in the screen coordinates--.